United States Patent
Hirose et al.

(10) Patent No.: US 8,617,703 B2
(45) Date of Patent: *Dec. 31, 2013

(54) GAS BARRIER LAYERED PRODUCT AND METHOD FOR PRODUCING THE SAME

(75) Inventors: Wataru Hirose, Kurashiki (JP); Tatsuya Oshita, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 456 days.

This patent is subject to a terminal disclaimer.

(21) Appl. No.: 12/936,814

(22) PCT Filed: Apr. 8, 2009

(86) PCT No.: PCT/JP2009/057225
§ 371 (c)(1),
(2), (4) Date: Oct. 7, 2010

(87) PCT Pub. No.: WO2009/125800
PCT Pub. Date: Oct. 15, 2009

(65) Prior Publication Data
US 2011/0027580 A1    Feb. 3, 2011

(30) Foreign Application Priority Data

Apr. 9, 2008  (JP) .................. 2008-101172
Sep. 25, 2008 (JP) .................. 2008-246189

(51) Int. Cl.
B32B 27/08   (2006.01)
B32B 27/30   (2006.01)
B05D 3/02    (2006.01)

(52) U.S. Cl.
USPC ........ 428/336; 427/376.2; 427/387; 428/447; 428/451

(58) Field of Classification Search
USPC ............... 427/376.2, 387; 428/336, 447, 451
See application file for complete search history.

(56) References Cited

U.S. PATENT DOCUMENTS 7,524,900 B2   4/2009  Nishiura et al. ............. 525/192
7,763,335 B2   7/2010  Oshita et al. ................ 428/35.2
8,206,798 B2 *  6/2012  Shibata et al. .............. 428/35.4

FOREIGN PATENT DOCUMENTS

| EP | 1 690 678 A1 | 8/2006 |
|---|---|---|
| EP | 1 892 089 A1 | 2/2008 |
| JP | 7 118543 | 5/1995 |
| JP | 2000 233478 | 8/2000 |
| JP | 2001 310425 | 11/2001 |
| JP | 2002 326303 | 11/2002 |
| JP | 2003 292713 | 10/2003 |
| JP | 2008 036914 | 2/2008 |
| WO | 2005 053954 | 6/2005 |
| WO | 2006 126511 | 11/2006 |

OTHER PUBLICATIONS

International Search Report issued Jul. 14, 2009 in PCT/JP09/057225 filed Apr. 8, 2009.
International Search Report issued Jul. 14, 2009 in PCT/JP09/057226 filed Feb. 18, 2009.
U.S. Appl. No. 12/936,814, filed Oct. 7, 2010, Hirose, et al.
U.S. Appl. No. 12/937,076, filed Oct. 8, 2010, Hirose, et al.
Extended European Search Report issued Nov. 13, 2012 in Patent Application No. 09730055.2.

* cited by examiner

Primary Examiner — D. S. Nakarani
(74) Attorney, Agent, or Firm — Oblon, Spivak, McClelland, Maier & Neustadt, L.L.P.

(57) ABSTRACT

The gas barrier layered product of the present invention includes a base and a gas barrier layer. The gas barrier layer is formed of a composition that includes a hydrolyzed condensate of a compound (L) and a neutralized product of a polymer (X) containing a carboxyl group or a carboxylic acid anhydride group. The compound (L) includes a specific compound (A) that contains $M^1$ (Al, Ti, or Zr) to which a hydrolyzable characteristic group is bonded and a specific compound (B) that contains Si to which a hydrolyzable characteristic group is bonded. At least part of —COO— group of the polymer (X) is neutralized with a metal ion having a valence of at least two. At least 80 mol % of the compound (B) is a compound expressed by a specific formula. The ratio of [the number of moles of $M^1$ in the compound (A)]/[the number of moles Si in the compound (B)] is in the range of 0.1/99.9 to 30.0/70.0.

17 Claims, No Drawings

GAS BARRIER LAYERED PRODUCT AND METHOD FOR PRODUCING THE SAME

TECHNICAL FIELD

The present invention relates to a layered product with gas barrier properties and a method for producing the same.

BACKGROUND ART

Materials for packaging foods and various articles are often required to have gas barrier properties, particularly, oxygen barrier properties. This is intended to prevent effects such as oxidation degradation of packaged contents due to oxygen, for example. In particular, with regard to food packages, the presence of oxygen allows microorganisms to proliferate and thereby the contents decay, which is a problem. Therefore, in conventional packaging materials, gas barrier layers for preventing oxygen from passing therethrough are provided, so that the permeation of oxygen, etc. is prevented.

Such a gas barrier layer can be, for example, metal foil, or a vapor deposition layer of metal or a metal compound. Generally, aluminum foil, an aluminum vapor deposition layer, a silicon oxide vapor deposition layer, an aluminum oxide vapor deposition layer, and the like are used. However, metal layers such as an aluminum foil and an aluminum vapor deposition layer have disadvantages, such as the invisibility of packaged contents and the difficulty of disposal. Furthermore, metal compound layers such as a silicon oxide vapor deposition layer and an aluminum oxide vapor deposition layer have disadvantages of considerable degradation of the gas barrier properties caused by deformation or dropping of the packaging material, or impact during transportation, for example.

Moreover, a layer formed of a vinyl alcohol polymer with excellent gas barrier properties, such as polyvinyl alcohol and ethylene-vinyl alcohol copolymer, may be used as a gas barrier layer in some cases. A layer formed of such a vinyl alcohol polymer has advantages of the transparency and less difficulty in disposal. Accordingly, the range of applications thereof is now increasing.

The above-mentioned vinyl alcohol polymer is crystallized by hydrogen bonds between the hydroxyl groups in the molecules, and thus exhibits gas barrier properties. Hence, the conventional vinyl alcohol polymer exhibits high gas barrier properties in a dry state. However, in a state where the polymer has absorbed moisture under the influence, for instance, of water vapor, the hydrogen bonds are weakened and thereby the gas barrier properties tend to deteriorate. Accordingly, it is difficult to allow a vinyl alcohol polymer such as polyvinyl alcohol to exhibit a high level of gas barrier properties under high humidity.

Further, materials containing a polymer compound and the hydrolyzed condensate of metal alkoxide (for instance, tetramethoxysilane) have been studied as a material with gas barrier properties (for example, JP 2002-326303 A, JP 7 (1995)-118543 A, and JP 2000-233478 A).

Moreover, a material formed of polyacrylic acid and a crosslinking component has been studied as a material with gas barrier properties (for example, JP 2001-310425 A).

Recently, retort foods, which are produced by packing contents in a food packaging material and then immersing it in hot water for a sterilization treatment, have become widespread. In such a situation, the required level of performance of packaging materials for retort foods, such as strength against bag-breakage at the time of dropping a food packaging material filled with contents, oxygen barrier properties after hot water sterilization, and oxygen barrier properties under high humidity during the delivery to a consumer, is increasing further. In particular, there is demand for packaging materials capable of achieving high oxygen barrier properties regardless of humidity and achieving high oxygen barrier properties even after being subjected to retorting, as well as having excellent strength and transparency. The above-mentioned conventional techniques, however, cannot satisfy such demand sufficiently.

As a result of studies to solve the above-mentioned problems, the inventors have found a method that enables the properties of a gas barrier layer to be improved dramatically (WO 2005/053954 A1). In this method, a gas barrier layer formed of a composition that includes the hydrolyzed condensate of metal alkoxide and a polymer containing a —COO— group is immersed in a solution that contains a metal ion having a valence of at least two. The —COO— group in the polymer is neutralized by this treatment.

According to the method of WO 2005/053954 A1, the properties of the gas barrier layer can be improved dramatically. However, the packaging materials to be used for retort pouch, for example, are required to withstand treatment under severe conditions, and thus desirably have higher properties. A reduction in thickness of the gas barrier layer is also required in order to enhance the dimensional stability during processing, such as printing and lamination, and the flexibility of a gas barrier layered product itself, so that the mechanical properties of the gas barrier layered product should be close to the original mechanical properties of a base film. However, when the gas barrier layer has a reduced thickness, its oxygen barrier properties deteriorate considerably in some cases. Further, the conventional gas barrier layers had a decrease in transparency in some cases when being subjected to retorting under severe conditions.

CITATION LIST

Patent Literature

Patent Literature 1: JP 2002-326303 A
Patent Literature 2: JP 7 (1995)-118543 A
Patent Literature 3: JP 2000-233478 A
Patent Literature 4: JP 2001-310425 A
Patent Literature 5: WO 2005/053954 A1

SUMMARY OF INVENTION

In view of such a situation, it is one of the objects of the present invention to provide a gas barrier layered product that: exhibits high oxygen barrier properties even if its gas barrier layer has a reduced thickness; maintains high oxygen barrier properties and transparency even after being subjected to retorting under severe conditions; has excellent dimensional stability during processing, such as printing and lamination, and excellent flexibility; and further has mechanical properties close to the original mechanical properties of a base film.

As a result of a series of studies in order to achieve the above-mentioned object, the inventors have found that an excellent gas barrier layer can be obtained by using a specific composition. The present invention is based on this new understanding.

That is, the gas barrier layered product of the present invention includes a base, and at least one layer with gas barrier properties that is stacked on the base. The layer with gas barrier properties is formed of a composition that includes the hydrolyzed condensate of at least one type of compound (L) containing a hydrolyzable characteristic group, and a neutralized product of a polymer (X) containing at least one functional group selected from a carboxyl group and a carboxylic acid anhydride group. The compound (L) includes a compound (A) and a compound (B) that contains Si to which the hydrolyzable characteristic group is bonded. The compound (A) is at least one type of compound expressed by the following Formula (I):

$$M^1 X^1_m Y^1_{n-m} \qquad (I),$$

where: $M^1$ denotes any one selected from Al, Ti, and Zr; $X^1$ denotes any one selected from F, Cl, Br, I, $OR^1$, $R^2COO$, $R^3COCH_2COR^4$, and $NO_3$; $Y^1$ denotes any one selected from F, Cl, Br, I, ORS, $R^6COO$, $R^7COCH_2COR^8$, $NO_3$ and $R^9$; $R^1$, $R^2$, $R^5$ and $R^6$ each denote a hydrogen atom or an alkyl group, independently; $R^3$, $R^4$, $R^7$, $R^8$ and $R^9$ each denote an alkyl group, independently; n is equal to the valence of $M^1$; and m denotes an integer of 1 to n.

The compound (B) includes at least one type of compound expressed by the following Formula (II):

$$Si(OR^{10})_p R^{11}_{4-p-q} X^2_q \qquad (II),$$

where: $R^{10}$ denotes an alkyl group; $R^{11}$ denotes an alkyl group, an aralkyl group, an aryl group or an alkenyl group; $X^2$ denotes a halogen atom; p and q each denote an integer of 0 to 4, independently; and $1 \leq p+q \leq 4$.

At least part of —COO— group contained in the functional group of the polymer (X) is neutralized with a metal ion having a valence of at least two. The percentage of the compound expressed by Formula (II) in the compound (B) is at least 80 mol %. The composition has the ratio of [the number of moles of $M^1$ atom derived from the compound (A)]/[the number of moles of Si atom derived from the compound (B)] in the range of 0.1/99.9 to 30.0./70.0.

Further, the method of the present invention for producing the gas barrier layered product includes the following steps: (i) forming, on a base, a layer formed of a composition that includes a polymer (X) and the hydrolyzed condensate of a compound (L) containing a hydrolyzable characteristic group; and (ii) bringing the layer into contact with a solution that contains a metal ion having a valence of at least two. The compound (L) includes a compound (A) and a compound (B) that contains Si to which the hydrolyzable characteristic group is bonded. The compound (A) is at least one type of compound expressed by the following Formula (I):

$$M^1 X^1_m Y^1_{n-m} \qquad (I),$$

where: $M^1$ denotes any one selected from Al, Ti, and Zr; $X^1$ denotes any one selected from F, Cl, Br, I, $OR^1$, $R^2COO$, $R^3COCH_2COR^4$, and $NO_3$; $Y^1$ denotes any one selected from F, Cl, Br, I, $OR^5$, $R^6COO$, $R^7COCH_2COR^8$, $NO_3$ and $R^9$; $R^1$, $R^2$, $R^5$ and $R^6$ each denote a hydrogen atom or an alkyl group, independently; $R^3$, $R^4$, $R^7$, $R^8$ and $R^9$ each denote an alkyl group, independently; n is equal to the valence of $M^1$; and m denotes an integer of 1 to n.

The compound (B) includes at least one type of compound expressed by the following Formula (II):

$$Si(OR^{10})_p R^{11}_{4-p-q} X^2_q \qquad (II),$$

where: $R^{10}$ denotes an alkyl group; $R^{11}$ denotes an alkyl group, an aralkyl group, an aryl group or an alkenyl group; $X^2$ denotes a halogen atom; p and q each denote an integer of 0 to 4, independently; and $1 \leq p+q \leq 4$.

The polymer (X) is a polymer containing at least one functional group selected from a carboxyl group and a carboxylic acid anhydride group. The percentage of the compound expressed by Formula (II) in the compound (B) is at least 80 mol %. The composition has the ratio of [the number of moles of $M^1$ atom derived from the compound (A)]/[the number of moles of Si atom derived from the compound (B)] in the range of 0.1/99.9 to 30.0/70.0.

The gas barrier layered product produced using the production method of the present invention constitutes another aspect of the gas barrier layered product of the present invention.

The gas barrier layered product of the present invention exhibits excellent oxygen barrier properties even if its gas barrier layer has a reduced thickness. Even after being subjected to retorting, the gas barrier layered product of the present invention maintains the excellent oxygen barrier properties and shows no appearance change in transparency, etc. These properties can be maintained, even if the retorting is carried out under more severe conditions. Further, the gas barrier layered product of the present invention allows a reduction in the thickness of the gas barrier layer, so that the mechanical properties of the gas barrier layered product of the present invention are close to the mechanical properties of the base film. Therefore, the gas barrier layered product of the present invention is excellent in mechanical properties such as flexibility, and tensile strength and elongation, and also excellent in dimensional stability during processing such as printing and lamination.

DESCRIPTION OF EMBODIMENTS

Embodiments of the present invention are described below. In the following descriptions, specific compounds may be described as examples of the substances that show particular functions. The present invention, however, is not limited thereto. Furthermore, materials exemplified herein can be used individually or in combination unless otherwise specified.

<Gas Barrier Layered Product>

The gas barrier layered product of the present invention includes a base and at least one layer with gas barrier properties stacked on the base. The layer (hereinafter referred to also as a "gas barrier layer") is formed of a specific composition. The composition includes the hydrolyzed condensate of at least one type of compound (L) containing a hydrolyzable characteristic group, and the neutralized product of a polymer (X) containing at least one functional group selected from a carboxyl group and a carboxylic acid anhydride group. The compound (L) is at least one type of compound containing the hydrolyzable characteristic group, and typically is at least one type of compound that contains a metal atom to which the hydrolyzable characteristic group is bonded. The compound (L) includes a compound (A) and a compound (B) that contains Si to which the hydrolyzable characteristic group is bonded. Hereinafter, the at least one functional group selected from a carboxyl group and a carboxylic acid anhydride group contained in the polymer (X) may be referred to as a "functional group (F)". At least part of —COO— group contained in the functional group (F) is neutralized with a metal ion having a valence of at least two. From another aspect, the —COO— group contained in the functional group (F) forms a salt with the metal ion having a valence of at least two.

The gas barrier layer is stacked on at least one surface of the base. The gas barrier layer may be stacked only on one surface of the base or may be formed on both surfaces of the base. The gas barrier layered product of the present invention may include a layer other than the gas barrier layer. The gas barrier layer may be stacked directly on the base or may be stacked on the base via another layer. That is, another layer may be interposed between the base and the gas barrier layer.

The percentage of the total of the hydrolyzed condensate of the compound (L) and the neutralized product of the polymer (X) in the composition is, for example, at least 50 wt %, at least 70 wt %, at least 80 wt %, at least 90 wt %, at least 95 wt %, or at least 98 wt %.

<Hydrolyzed Condensate>

The composition that forms the gas barrier layer contains the hydrolyzed condensate of the compound (L). The hydrolysis of the compound (L) allows at least part of the characteristic group of the compound (L) to be substituted by a hydroxyl group. Further, the hydrolysate is condensed to form a compound to which a metal atom is bonded via oxygen. This condensation is repeated, which allows a compound that can be considered substantially as a metal oxide to be formed. In this case, in order to cause the hydrolysis and condensation, it is important that the compound (L) should contain a hydrolyzable characteristic group (functional group). When such a group is not bonded to the compound (L), the hydrolysis and condensation do not occur or occur very slowly. Accordingly, in such a case, it is difficult to obtain the effects of the present invention. Si may be classified into a semimetal element in some cases but is described as a metal in this description.

The hydrolyzed condensate can be produced, for example, from a specific raw material by a technique to be used in a known sol-gel method. Examples of the raw material to be used include the compound (L), the partial hydrolysate of the compound (L), the total hydrolysate of the compound (L), the partially hydrolyzed condensate of the compound (L), the partial condensate of the total hydrolysate of the compound (L), and a combination thereof. These raw materials may be produced using a known method, or commercially available raw materials may be used. The raw material is not particularly limited. For example, a condensate to be obtained by the hydrolysis and condensation of approximately 2 to 10 molecules can be used as the raw material. Specifically, the raw material can be a linear condensate of dimer to decamer obtained by the hydrolysis and condensation of tetramethoxysilane, for example.

The compound (A) is at least one type of compound expressed by the following Formula (I):

$$M^1 X^1_m Y^1_{n-m} \quad (I),$$

where: $M^1$ denotes any one selected from Al, Ti, and Zr; $X^1$ denotes any one selected from F, Cl, Br, I, $OR^1$, $R^2COO$, $R^3COCH_2COR^4$, and $NO_3$; $Y^1$ denotes any one selected from F, Cl, Br, I, $OR^5$, $R^6COO$, $R^7COCH_2COR^8$, $NO_3$ and $R^9$; $R^1$, $R^2$, $R^5$ and $R^6$ each denote a hydrogen atom or an alkyl group, independently; $R^3$, $R^4$, $R^7$, $R^8$ and $R^9$ each denote an alkyl group, independently; n is equal to the valence of $M^1$; and m denotes an integer of 1 to n.

$X^1$ may be identical to or different from $Y^1$. $M^1$ is preferably Al because the changes in oxygen barrier properties and appearance, such as transparency, of the gas barrier layered product to be obtained before and after being subjected to retorting can be reduced particularly. $X^1$ is a hydrolyzable group. $X^1$ is preferably any one selected from Cl, $OR^1$, and $NO_3$, more preferably $OR^1$. $Y^1$ is preferably any one selected from Cl, $OR^5$, and $NO_3$, more preferably $OR^5$.

The number of carbon atoms contained in the alkyl group to be used as $R^1$, $R^2$, $R^5$ and $R^6$ is preferably at least 1 and not more than 20, more preferably at least 1 and not more than 10, and for example, at least 1 and not more than 4. $R^1$ and $R^5$ each are preferably a methyl group, an ethyl group, an isopropyl group, an n-butyl group, or a t-butyl group, particularly preferably an isopropyl group or n-butyl group. The number of carbon atoms contained in the alkyl group to be used as $R^3$, $R^4$, $R^7$, $R^8$ and $R^9$ is preferably at least 1 and not more than 4, more preferably at least 1 and not more than 2. $R^3$, $R^4$, $R^7$ and $R^8$ each are preferably a methyl group or an ethyl group. $R^3COCH_2COR^4$ and $R^7COCH_2COR^8$ each are coordinately bonded to $M^1$ atom via their carbonyl group. $R^9$ is preferably a methyl group or an ethyl group. The value of [n–m] in Formula (I) may be 0 or 1, for example.

Specific examples of the compound (A) include aluminum compounds such as aluminum chloride, aluminum triethoxide, aluminum tri-normal propoxide, aluminum triisopropoxide, aluminum tri-normal butoxide, aluminum tri-t-butoxide, aluminum triacetate, aluminum acetylacetonate, and aluminum nitrate; titanium compounds such as titanium tetraisopropoxide, titanium tetra-normal butoxide, titanium tetra(2-ethylhexoxide), titanium tetramethoxide, titanium acetylacetonate, and titanium ethylacetoacetate; and zirconium compounds such as zirconium tetra-normal propoxide, zirconium tetrabutoxide, and zirconium tetraacetylacetonate. Preferred examples of the compound (A) include aluminum triisopropoxide and aluminum tri-normal butoxide.

The compound (B) is at least one type of Si compound that contains Si to which the hydrolyzable characteristic group is bonded. The compound (B) includes at least one type of compound expressed by the following Formula (II):

$$Si(OR^{10})_p R^{11}_{4-p-q} X^2_q \quad (II),$$

where; $R^{10}$ denotes an alkyl group; $R^{11}$ denotes an alkyl group, an aralkyl group, an aryl group or an alkenyl group; $X^2$ denotes a halogen atom; p and q each denote an integer of 0 to 4, independently; and $1 \leq p+q \leq 4$.

The alkyl group denoted by $R^{10}$ may be a methyl group, an ethyl group, an n-propyl group, an isopropyl group, an n-butyl group, or a t-butyl group, and is preferably a methyl group or an ethyl group. The halogen atom denoted by $X^2$ may be a chlorine atom, a bromine atom, or an iodine atom, for example, and is preferably a chlorine atom. Further, the alkyl group denoted by $R^{11}$ may be a methyl group, an ethyl group, an n-propyl group, an isopropyl group, an n-butyl group, a t-butyl group, or an n-octyl group, for example. The aralkyl group denoted by $R^{11}$ may be a benzyl group, a phenethyl group, or a trityl group, for example. Further, the aryl group denoted by $R^{11}$ may be a phenyl group, a naphthyl group, a tolyl group, a xylyl group, or a mesityl group, for example. The alkenyl group denoted by $R^{11}$ may be a vinyl group, or an allyl group, for example.

Specific examples of the compound (B) expressed by Formula (II) include tetrachlorosilane, tetrabromosilane, tetramethoxysilane, tetraethoxysilane, methyltrimethoxysilane, ethyltrimethoxysilane, octyltrimethoxysilane, phenyltrimethoxysilane, vinyltrimethoxysilane, vinyltriethoxysilane, chlorotrimethoxysilane, chlorotriethoxysilane, dichlorodimethoxysilane, dichlorodiethoxysilane, trichloromethoxysilane, trichloroethoxysilane, and vinyltrichlorosilane. Preferred examples of the compound (B) expressed by Formula (II) include tetramethoxysilane and tetraethoxysilane.

The compound (B) may further include at least one type of compound expressed by the following Formula (III) in addition to the compound expressed by Formula (II). When the compound expressed by Formula (III) is contained therein, the changes in oxygen barrier properties and appearance, such as transparency, before and after boiling or before and after retorting can be reduced further.

$$Si(OR^{12})_r X^3_s Z^3_{4-r-s} \quad (III),$$

where: $R^{12}$ denotes an alkyl group; $X^3$ denotes a halogen atom; $Z^3$ denotes an alkyl group substituted by a functional group having reactivity with a carboxyl group; r and s each denote an integer of 0 to 3, independently; and $1 \leq r+s \leq 3$.

The alkyl group denoted by $R^{12}$ may be a methyl group, an ethyl group, an n-propyl group, an isopropyl group, an n-butyl group, or a t-butyl group, for example, and is preferably a methyl group or an ethyl group. The halogen atom denoted by $X^3$ may be a chlorine atom, a bromine atom, or an iodine atom, for example, and is preferably a chlorine atom. Examples of the functional group that has reactivity with a carboxyl group and is contained in $Z^3$ include an epoxy group, an amino group, a hydroxyl group, a halogen atom, a mercapto group, an isocyanate group, an ureide group, an oxazoline group, and a carbodiimide group. Among them, an epoxy group, an amino group, an isocyanate group, a ureide group, or a halogen atom is preferred, because the changes in oxygen barrier properties and appearance, such as transparency, of the gas barrier layered product to be obtained before and after retorting can be reduced particularly. The functional group may be at least one selected from an epoxy group, an amino group, and an isocyanate group, for example. Examples of the alkyl group substituted by such a functional group include those exemplified for $R^{12}$.

Specific examples of the compound expressed by Formula (III) include gamma-glycidoxypropyltrimethoxysilane, gamma-glycidoxypropyltriethoxysilane, gamma-glycidoxypropyltrichlorosilane, gamma-aminopropyltrimethoxysilane, gamma-aminopropyltriethoxysilane, gamma-aminopropyltrichlorosilane, gamma-chloropropyltrimethoxysilane, gamma-chloropropyltriethoxysilane, gamma-chloropropyltrichlorosilane, gamma-bromopropyltrimethoxysilane, gamma-bromopropyltriethoxysilane, gamma-bromopropyltrichlorosilane, gamma-mercaptopropyltrimethoxysilane, gamma-mercaptopropyltriethoxysilane, gamma-mercaptopropyltrichlorosilane, gamma-isocyanatepropyltrimethoxysilane, gamma-isocyanatepropyltriethoxysilane, gamma-isocyanatepropyltrichlorosilane, gamma-ureidopropyltrimethoxysilane, gamma-ureidopropyltriethoxysilane, and gamma-ureidopropyltrichlorosilane. Preferred examples of the compound expressed by Formula (III) include gamma-glycidoxypropyltrimethoxysilane, gamma-glycidoxypropyltriethoxysilane, gamma-chloropropyltrimethoxysilane, gamma-chloropropyltriethoxysilane, gamma-aminopropyltrimethoxysilane, and gamma-aminopropyltriethoxysilane.

The inventors have found that the gas barrier layered product obtained using the hydrolyzed condensate of the compound (L) that includes the compound (A) and the compound (B) exhibits excellent gas barrier properties and hot-water resistance, such as boiling-water resistance and retort resistance. That is, the gas barrier layered product of the present invention was found not only to be excellent in gas barrier properties but also to be capable of maintaining the excellent gas barrier properties even after being subjected to boiling or retorting as well as showing no change in appearance. Further, it has been newly found that the gas barrier layered product of the present invention could maintain the high gas barrier properties owing to the use of the hydrolyzed condensate of the compound (L) even when the gas barrier layer had a reduced thickness, which was surprising, whereas the conventional gas barrier layered product had a considerable decrease in gas barrier properties when the gas barrier layer had a reduced thickness in some cases as mentioned above.

The ratio of [the number of moles of $M^1$ atom derived from the compound (A)]/[the number of moles of Si atom derived from the compound (B)] is required to be in the range of 0.1/99.9 to 30.0/70.0 (for example, 0.1/99.9 to 29.9/70.1) in both cases where the compound (B) is composed only of the compound expressed by Formula (II) and where the compound (B) includes the compound expressed by Formula (III). When the above-mentioned molar ratio is in this range, a gas barrier layered product that exhibits excellent gas barrier properties and hot-water resistance, such as boiling-water resistance and retort resistance, as mentioned above, can be obtained. When the percentage of $M^1$ in the total of $M^1$ and Si is less than 0.1 mol %, the hot-water resistance may decrease, the gas barrier properties after retorting may deteriorate, and further the appearance may be impaired. Further, the percentage more than 30 mol % causes a problem that the gas barrier properties before and after retorting deteriorate. Moreover, for better gas barrier properties and retort resistance, the ratio of [the number of moles of $M^1$ atom derived from the compound (A)]/[the number of moles of Si atom derived from the compound (B)] is preferably in the range of 1.2/98.8 to 30.0/70.0, more preferably in the range of 1.9/98.1 to 30.0/70.0, further preferably in the range of 2.8/97.2 to 30.0/70.0. The above-mentioned ratio may also be in the range of 0.5/99.5 to 30.0/70.0, in the range of 1.5/98.5 to 20.0/80.0, or in the range of 2.5/97.5 to 10.0/90.0.

The inventors have found that the gas barrier layered product obtained by using the hydrolyzed condensate of the compound (L) that includes the compound expressed by Formula (III) in addition to the compound (A) and the compound expressed by Formula (II) exhibits more excellent gas barrier properties and hot-water resistance, such as boiling-water resistance and retort resistance.

In the case where the compound (B) includes the compound expressed by Formula (III), it is preferred that the following conditions be satisfied further. That is, the ratio of [the number of moles of Si derived from the compound expressed by Formula (II)]/[the number of moles of Si derived from the compound expressed by Formula (III)] is preferably in the range of 99.5/0.5 to 80.0/20.0. This ratio exceeding 99.5/0.5 might decrease the property of showing no change in the gas barrier properties and appearance, such as transparency, before and after boiling or retorting, that is, the hot-water resistance of the gas barrier layered product to be obtained. Further, when this ratio is less than 80/20, the gas barrier properties of the gas barrier layered product might deteriorate. Further, this ratio is more preferably in the range of 98.0/2.0 to 89.9/10.1 because such a range provides better hot-water resistance and gas barrier properties to the resultant gas barrier layered product.

The percentage of the total of the compound (A) and the compound (B) in the compound (L) is, for example, at least 80 mol % and not more than 100 mol %, and may be at least 90 mol %, at least 95 mol %, at least 98 mol %, at least 99 mol %, or 100 mol %.

The percentage of the compound expressed by Formula (II) in the compound (B) (the Si compound that is the compound (L)) is at least 80 mol % and not more than 100 mol %, and may be at least 90 mol %, at least 95 mol %, at least 98 mol %, or 100 mol %, for example. In an example, the compound (B) is composed only of the compound expressed by Formula (II), whereas the compound (B) is composed only of the compound expressed by Formula (II) and the compound expressed by Formula (III) in another example.

The number of molecules to be condensed in the hydrolyzed condensate of the compound (L) can be controlled by adjusting the conditions to be employed in the hydrolysis and condensation. For example, the number of molecules to be condensed can be controlled by adjusting the amount of water, the type and concentration of a catalyst, the hydrolysis and condensation temperature, or the like.

For better gas barrier properties of the gas barrier layered product, the ratio of [the weight of the inorganic component derived from the compound (L)]/[the total of the weight of the organic component derived from the compound (L) and the weight of the organic component derived from the polymer (X)] is preferably in the range of 20.0/80.0 to 80.0/20.0, more preferably in the range of 30.5/69.5 to 70/30, in the composition that forms the gas barrier layer.

The weight of the inorganic component derived from the compound (L) can be calculated from the weight of the raw material used in preparing the composition. That is, supposing that the compound (L), the partial hydrolysate of the compound (L), the total hydrolysate of the compound (L), the partially hydrolyzed condensate of the compound (L), the partial condensate of the total hydrolysate of the compound (L), or a combination thereof has been totally hydrolyzed and condensed to form a metal oxide, the weight of the metal oxide is regarded as the weight of the inorganic component derived from the compound (L).

The calculation of the weight of the metal oxide is described below further in detail. In the case of the compound (A) expressed by Formula (I) being free from $R^9$, the total hydrolysis and condensation of the compound (A) result in a compound formed of a composition expressed by the formula: $M^1O_{n/2}$. Further, in the case of the compound (A) expressed by Formula (I) containing $R^9$, the total hydrolysis and condensation of the compound (A) result in a compound formed of a composition expressed by the formula: $M^1O_{m/2}R^9_{n-m}$. In this compound, $M^1O_{m/2}$ is a metal oxide. $R^9$ is regarded as the organic component derived from the compound (L). The compound (B) can be also calculated in the same manner. In this case, $R^{11}$ and $Z^3$ are regarded as the organic component derived from the compound (L). The content (%) of the hydrolyzed condensate in this description is a value obtained by: dividing the weight of the metal oxide by the weight of the effective components added by the end of step (i) to be described later; and multiplying it by 100. In this case, the weight of the effective components herein means the value obtained by subtracting, from the weight of all the components added by the end of the later-mentioned step (i), the weight of the volatile components such as solvents and compounds that are produced in the process in which the above-mentioned compound (L) changes into a metal oxide.

It should be noted that, in the case where the polymer (X) is neutralized with an ion other than metal ions (e.g., ammonium ion), the weight of the ion (e.g., ammonium ion) is also added to the weight of the organic component derived from the polymer (X).

<Carboxylic Acid-Containing Polymer (Polymer (X))>

The composition that forms the gas barrier layer includes the neutralized product of the polymer containing at least one functional group selected from a carboxyl group and a carboxylic acid anhydride group. Hereinafter, the polymer may be referred to as a "carboxylic acid-containing polymer". The neutralized product of the carboxylic acid-containing polymer can be obtained by neutralizing at least part of the —COO— group contained in the functional group of the carboxylic acid-containing polymer with a metal ion having a valence of at least two. The carboxylic acid-containing polymer has at least two carboxyl groups or at least one carboxylic acid anhydride group in one molecule of the polymer. Specifically, a polymer that contains at least two constitutional units each having at least one carboxyl group, such as acrylic acid units, methacrylic acid units, maleic acid units, and itaconic acid units, in one molecule of the polymer can be used. It is also possible to use a polymer that contains a constitutional unit having the structure of carboxylic acid anhydride, such as a maleic anhydride unit and a phthalic anhydride unit. The carboxylic acid-containing polymer may contain one type, or two or more types of the constitutional units each having at least one carboxyl group and/or the constitutional unit having the structure of carboxylic acid anhydride (hereinafter they may be referred to collectively as a "carboxylic acid-containing unit (G)" in some cases).

Further, the gas barrier layered product having good gas barrier properties can be obtained by adjusting the content of the carboxylic acid-containing unit (G) in all of the constitutional unit(s) in the carboxylic acid-containing polymer to 10 mol % or more. This content is more preferably 20 mol % or more, further preferably 40 mol % or more, particularly preferably 70 mol % or more. In the case where the carboxylic acid-containing polymer includes both of the constitutional units each having at least one carboxyl group and the constitutional unit having the structure of carboxylic acid anhydride, the total of the contents thereof is preferably in the above-mentioned range.

Besides the carboxylic acid-containing unit (G), other constitutional units that may be contained in the carboxylic acid-containing polymer are not particularly limited. Examples thereof include at least one type of constitutional unit selected from: constitutional units derived from (meth)acrylate esters, such as a methyl acrylate unit, a methyl methacrylate unit, an ethyl acrylate unit, an ethyl methacrylate unit, a butyl acrylate unit, and a butyl methacrylate unit; constitutional units derived from vinyl esters, such as a vinyl formate unit, and a vinyl acetate unit; and constitutional units derived from olefins, such as a styrene unit, a p-styrenesulfonic acid unit, an ethylene unit, a propylene unit, and an isobutylene unit. When the carboxylic acid-containing polymer contains two or more types of constitutional units, the carboxylic acid-containing polymer can take any one of the following forms: the form of an alternating copolymer, the form of a random copolymer, the form of a block copolymer, and in addition, the form of a tapered copolymer.

Examples of the carboxylic acid-containing polymer include polyacrylic acid, polymethacrylic acid, and poly (acrylic acid/methacrylic acid). For instance, the carboxylic acid-containing polymer may be at least one type of polymer selected from polyacrylic acid and polymethacrylic acid. Furthermore, specific examples of the carboxylic acid-containing polymer that contains the above-described constitutional units other than the carboxylic acid-containing unit (G) include an ethylene-maleic anhydride copolymer, a styrene-maleic anhydride copolymer, an isobutylene-maleic anhydride alternating copolymer, an ethylene-acrylic acid copolymer, and a saponified product of an ethylene-ethyl acrylate copolymer.

The molecular weight of the carboxylic acid-containing polymer is not particularly limited. However, the number average molecular weight thereof is preferably at least 5,000, more preferably at least 10,000, further preferably at least 20,000, because such a range provides excellent gas barrier properties and excellent mechanical properties such as drop impact strength to the resultant gas barrier layered product. There is no particular upper limit on the molecular weight of the carboxylic acid-containing polymer. However, it is generally 1,500,000 or less.

Similarly, the molecular weight distribution of the carboxylic acid-containing polymer is also not particularly limited. However, in order to achieve good surface appearance, such as the haze, of the gas barrier layered product and good storage stability of a solution (U) to be described later, the molecular weight distribution that is indicated by the ratio of the weight-average molecular weight/the number-average molecular weight of the carboxylic acid-containing polymer is preferably in the range of 1 to 6, more preferably in the range of 1 to 5, further preferably in the range of 1 to 4.

<Neutralization (Ionization)>

The neutralized product of the carboxylic acid-containing polymer can be obtained by neutralizing at least part of the at least one functional group (functional group (F)) selected from a carboxyl group and a carboxylic acid anhydride group of the carboxylic acid-containing polymer with a metal ion having a valence of at least two. In other words, this polymer contains a carboxyl group neutralized with a metal ion having a valence of at least two.

It is important for the metal ion that neutralizes the functional group (F) to have a valence of at least two. When the functional group (F) has not been neutralized or has been neutralized only with a monovalent ion, the layered product having good gas barrier properties cannot be obtained. Specific examples of the metal ion having a valence of at least two include calcium ion, magnesium ion, divalent iron ion, trivalent iron ion, zinc ion, divalent copper ion, lead ion, divalent mercury ion, barium ion, nickel ion, zirconium ion, aluminum ion, and titanium ion. For example, the metal ion having a valence of at least two may be at least one ion selected from the group consisting of calcium ion, magnesium ion, barium ion, zinc ion, iron ion and aluminum ion.

For example, at least 10 mol % (for instance, at least 15 mol %) of the —COO— group contained in the functional group (F) of the carboxylic acid-containing polymer is neutralized with a metal ion having a valence of at least two. The gas barrier layered product of the present invention exhibits good gas barrier properties when the carboxyl group and/or the carboxylic acid anhydride group in the carboxylic acid-containing polymer are neutralized with a metal ion having a valence of at least two.

The carboxylic acid anhydride group is deemed to include two —COO— groups. That is, when a mol of a carboxyl group and b mol of a carboxylic acid anhydride group are present, the mol of the —COO— group contained therein is (a+2b) mol in total. The ratio of the —COO— group neutralized with a metal ion having a valence of at least two with respect to the —COO— group contained in the functional group (F) is preferably at least 60 mol % but not more than 100 mol %, more preferably at least 70 mol %, further preferably at least 80 mol %. Higher gas barrier properties can be achieved by increasing the ratio of the —COO— group to be neutralized.

The degree of neutralization (the degree of ionization) of the functional group (F) can be determined by measuring the infrared absorption spectrum of the gas barrier layered product using the ATR (attenuated total reflection) method, or by removing the gas barrier layer from the gas barrier layered product and then measuring the infrared absorption spectrum thereof using the KBr method. Further, the degree of neutralization can be determined also by obtaining the value of the X-ray fluorescence intensity of the metal element that has been used for ionization using X-ray fluorescence spectrometry.

In the infrared absorption spectrum, the peak attributed to C=O stretching vibration of the carboxyl group or carboxylic acid anhydride group before the neutralization (before the ionization) is observed in the range of 1600 $cm^{-1}$ to 1850 $cm^{-1}$, while the C=O stretching vibration of the carboxyl group after the neutralization (after the ionization) is observed in the range of 1500 $cm^{-1}$ to 1600 $cm^{-1}$. Accordingly, they can be evaluated individually in the infrared absorption spectrum. Specifically, the ratios of them are determined from the maximum absorbance in each range, so that the degree of ionization of the polymer that forms the gas barrier layer of the gas barrier layered product can be calculated using a standard curve prepared beforehand. The standard curve can be prepared by measuring the infrared absorption spectrum for a plurality of standard samples each having a different degree of neutralization.

In the case where the film thickness of the gas barrier layer is 1 μm or less and the base contains an ester bond, the degree of ionization cannot be calculated accurately because the peak of the ester bond contained in the base is detected in the infrared absorption spectrum obtained using the ATR method and the detected peak overlaps the peak of the —COO— in the carboxylic acid-containing polymer (polymer (X)) that forms the gas barrier layer. Therefore, the degree of ionization of the polymer (X) that forms the gas barrier layer with a film thickness of 1 μm or less should be calculated based on the results given by the X-ray fluorescence spectrometry.

Specifically, the degree of ionization of the polymer (X) that forms the gas barrier layer stacked on the base free from ester bonds is determined from the infrared absorption spectrum. Next, the layered product for which the degree of ionization has been determined is subjected to the X-ray fluorescence spectrometry to calculate the X-ray fluorescence intensity of the metal element used for the ionization. Subsequently, the calculations are performed in the same manner for layered products that are different only in the degree of ionization. The correlation between the degree of ionization and the X-ray fluorescence intensity of the metal element used for the ionization is calculated therefrom, so that a standard curve is prepared. Then, the gas barrier layered product that uses the base containing an ester bond is subjected to the X-ray fluorescence spectrometry, and the degree of ionization is calculated from the X-ray fluorescence intensity of the metal element used for the ionization based on the above-mentioned standard curve.

<Compound (P)>

The composition that forms the gas barrier layer of the present invention may include a compound (P) containing at least two amino groups. The compound (P) is a compound different from the compound (L) and the polymer (X). In the case where the composition further includes the compound (P), at least part of the —COO— group contained in the functional group (F) of the polymer (X) is allowed to be neutralized and/or reacted with the compound (P). Examples of the compound (P) to be used include alkylenediamines, polyalkylene polyamines, alicyclic polyamines, aromatic polyamines, and polyvinylamines. Among these, alkylenediamines are preferred in order to obtain the gas barrier layered product with better gas barrier properties.

Specific examples of the compound (P) include hydrazine, ethylenediamine, propylenediamine, hexamethylenediamine, diethylenetriamine, triethylenetetramine, diaminodiphenylmethane, 1,3-diaminocyclohexane, 1,2-diaminocyclohexane, 1,4-diaminocyclohexane, xylylenediamine, chitosan, polyallylamine, and polyvinylamine. The compound (P) is preferably ethylenediamine, propylenediamine or chitosan, in order to achieve the gas barrier layered product with better gas barrier properties.

For better hot-water resistance of the gas barrier layered product of the present invention, the molar ratio of [the amino groups contained in the compound (P)]/[the —COO— group contained in the functional group of the carboxylic acid-containing polymer] is preferably in the range of 0.2/100 to 20/100, more preferably in the range of 0.5/100 to 15/100, particularly preferably in the range of 1/100 to 10/100.

When the compound (P) is added to the carboxylic acid-containing polymer, the compound (P) may be neutralized with acid in advance. Examples of the acid to be used for the neutralization include hydrochloric acid, nitric acid, sulfuric acid, acetic acid, and carbonic acid. For better gas barrier properties of the gas barrier layered product to be obtained, hydrochloric acid, acetic acid, and carbonic acid are used preferably.

<Compound (Q)>

The composition that forms the gas barrier layer of the present invention may include a compound (Q) containing at least two hydroxyl groups. In the case where the composition further includes the compound (Q), at least part of the —COO— group contained in the functional group of the polymer (X) is reacted with the compound (Q) to form an ester bond. Such an embodiment allows the gas barrier properties of the gas barrier layered product after being stretched to be improved. More specifically, the addition of the compound (Q) renders the gas barrier layer unlikely to be damaged even when the gas barrier layered product is stretched. As a result, high gas barrier properties can be maintained even after the gas barrier layered product is stretched. For example, a reduction in the gas barrier properties of the gas barrier layered product can be prevented even after the gas barrier layered product is stretched, when tension is applied during processing (e.g., printing and lamination) or being stretched when a bag filled with food products is dropped, for example.

The compound (Q) is a compound different from the compound (L) and the polymer (X). Examples of the compound (Q) include a low molecular weight compound and a high molecular weight compound. Preferred examples of the compound (Q) include polymeric compounds such as polyvinyl alcohol, partially saponified polyvinyl acetate, ethylene-vinyl alcohol copolymer, polyethylene glycol, polyhydroxyethyl (meth)acrylate, polysaccharides such as starch, and polysaccharide derivatives derived from polysaccharides such as starch.

As long as the effects of the present invention are not impaired, the composition that forms the gas barrier layer may include, if desired: inorganic acid metal salts such as carbonate, hydrochloride, nitrate, hydrogen carbonate, sulfate, hydrogen sulfate, phosphate, borate, and aluminate; organic acid metal salts such as oxalate, acetate, tartrate, and stearate; metal complexes such as an acetylacetonate metal complex, e.g., aluminum acetylacetonate, a cyclopentadienyl metal complex, e.g., titanocene, and a cyano metal complex; a layered clay compound; a crosslinking agent; a plasticizer; an antioxidant; an ultraviolet absorber; and a flame retardant. The composition that forms the gas barrier layer may also contain fine powder of a metal oxide, fine silica powder, etc.

<Base>

Bases made of various materials can be used as the base constituting the gas barrier layered product according to the present invention. Examples of the base include: films such as a thermoplastic resin film and a thermosetting resin film; fiber assembly such as fabrics, and papers; wood; and films in a specific shape made of a metal oxide, a metal, or the like. Among them, thermoplastic resin film is particularly useful as the base of the gas barrier layered product to be used for a food packaging material. Furthermore, the base may include a paper layer. A layered product for a paper container can be obtained by using a base including a paper layer. In addition, the base may have a multilayered structure formed of a plurality of materials.

Examples of the thermoplastic resin film include films formed by processing of polyolefin resins such as polyethylene, and polypropylene; polyester resins such as polyethylene terephthalate, polyethylene-2,6-naphthalate, polybutylene terephthalate, and copolymers thereof; polyamide resins such as nylon 6, nylon 66, and nylon 12; polystyrene; poly(meth)acrylic ester; polyacrylonitrile; polyvinyl acetate; polycarbonate; polyarylate; regenerated cellulose; polyimide; polyetherimide; polysulfone; polyethersulfone; polyetheretherketone; and ionomer resins. Preferred examples of the base of a layered product to be used for a food packaging material include films made of polyethylene, polypropylene, polyethylene terephthalate, nylon 6, and nylon 66.

The thermoplastic resin film may be a stretched film or may be a non-stretched film. However, stretched films, particularly biaxially stretched films, are preferred because these films allow the gas barrier layered product of the present invention to have excellent processability, for example, in printing and lamination. The biaxially stretched film may be produced using any method such as simultaneous biaxial stretching, sequential biaxial stretching, and tubular stretching.

The gas barrier layered product of the present invention may further include an adhesive layer (H) disposed between the base and the gas barrier layer. According to this configuration, the adhesiveness between the base and the gas barrier layer can be improved. The adhesive layer (H) made of an adhesive resin can be formed by treating the surface of the base with a known anchor coating agent, or applying a known adhesive onto the surface of the base. As a result of the studies on various adhesive resins, it was found that an adhesive resin containing a urethane bond in which the percentage of the nitrogen atom (the nitrogen atom of the urethane bond) in the entire resin was in the range of 0.5 to 12 wt % was preferred. The adhesiveness between the base and the gas barrier layer can be improved particularly by using such an adhesive resin. A strong bond between the base and the gas barrier layer with the adhesive layer (H) interposed therebetween can prevent the gas barrier properties and appearance from deteriorating when the gas barrier layered product of the present invention is subjected to processing such as printing and lamination. The content of the nitrogen atom (the nitrogen atom of the urethane bond) in the adhesive resin is more preferably in the range of 2 to 11 wt %, further preferably in the range of 3 to 8 wt %.

As an adhesive resin containing a urethane bond, a two-component reactive polyurethane adhesive in which a polyisocyanate component and a polyol component are mixed together to react with each other is preferred.

The strength of the gas barrier layered product can be improved by increasing the thickness of the adhesive layer (H). However, when the thickness of the adhesive layer (H) is increased excessively, the appearance is deteriorated. The thickness of the adhesive layer (H) is preferably in the range of 0.03 µm to 0.18 µm. Such an adhesive layer can prevent the gas barrier properties and appearance from deteriorating when the gas barrier layered product of the present invention is subjected to processing such as printing and lamination. In addition, the adhesive layer can improve the drop strength of the packaging material that uses the gas barrier layered product of the present invention. The thickness of the adhesive layer (H) is more preferably in the range of 0.04 µm to 0.14 µm, further preferably in the range of 0.05 µm to 0.10 µm.

The total thickness of the gas barrier layer(s) included in the gas barrier layered product of the present invention is preferably 1.0 µm or less, and for example, 0.9 µm or less. A reduction in the thickness of the gas barrier layer(s) allows the level of the dimensional change of the gas barrier layered product of the present invention to be kept low in processing such as printing and lamination, and further increases the flexibility of the gas barrier layered product of the present invention. Thus, it is possible to make the mechanical properties of the gas barrier layered product close to the original mechanical properties of the film used as the base. The gas barrier layered product of the present invention allows the oxygen permeability in an atmosphere of 20° C. and 85% RH to be 1.1 cm$^3$/(m$^2$·day·atm) or less (for example, 1.0 cm$^3$/(m$^2$·day·atm) or less), even when the total thickness of the gas barrier layer(s) included in the layered product is 1.0 μm or less (for example, 0.9 μm or less). The thickness of each gas barrier layer is preferably 0.05 μm or more (for example, 0.15 μm or more) because such a gas barrier layer provides good gas barrier properties to the gas barrier layered product of the present invention. The total thickness of the gas barrier layer(s) is further preferably 0.1 μm or more (for example, 0.2 μm or more). The thickness of the gas barrier layer(s) can be controlled by the concentration of the solution and the coating application method that are used for forming the gas barrier layer(s).

The layered product of the present invention may include a layer formed of an inorganic substance (hereinafter also referred to as an "inorganic layer") between the base and the gas barrier layer. The inorganic layer can be formed of an inorganic substance such as inorganic oxides. The inorganic layer can be formed by vapor phase film formation such as vapor deposition.

The inorganic substance that forms the inorganic layer should be one having gas barrier properties against oxygen, water vapor, etc. Preferably, it is transparent. The inorganic layer can be formed using an inorganic oxide such as aluminum oxide, silicon oxide, silicon oxynitride, magnesium oxide, tin oxide, or a mixture thereof, for example. Among them, aluminum oxide, silicon oxide, and magnesium oxide can be used preferably since they have excellent barrier properties against gases such as oxygen and water vapor.

Preferred thickness of the inorganic layer varies depending on the type of inorganic oxide that forms the inorganic layer, but is generally in the range of 2 nm to 500 nm. The thickness can be selected in this range so that the gas barrier layered product has good gas barrier properties and mechanical properties. In the case where the thickness of the inorganic layer is less than 2 nm, the inorganic layer has no reproducibility in exhibiting the barrier properties against gases such as oxygen and water vapor, and does not exhibit satisfactory gas barrier properties in some cases. In the case where the thickness of the inorganic layer exceeds 500 nm, the gas barrier properties of the inorganic layer tend to deteriorate when the gas barrier layered product is stretched or bended. The thickness of the inorganic layer is preferably in the range of 5 to 200 nm, more preferably in the range of 10 to 100 nm.

The inorganic layer can be formed by depositing an inorganic oxide on the base. Examples of the formation method include vacuum deposition, sputtering, ion plating, chemical vapor deposition (CVD), etc. Among them, the vacuum deposition can be used preferably in view of productivity. A preferred heating method that is employed for carrying out the vacuum deposition is one of electron beam heating, resistance heating, and induction heating. In order to improve the adhesiveness between the inorganic layer and the base as well as the denseness of the inorganic layer, the plasma assisted deposition or the ion beam assisted deposition may be employed in the deposition. In order to improve the transparency of the inorganic layer, reactive evaporation in which a reaction is caused, for example, by injecting oxygen gas may be employed in the deposition.

The microstructure of the gas barrier layer is not particularly limited. However, it is preferred that the gas barrier layer have the microstructure described below because in that case the gas barrier properties can be prevented from deteriorating when the gas barrier layered product is stretched. A preferred microstructure is a sea-island structure composed of a sea phase (α) and an island phase (β). The island phase (β) is a region where the proportion of the hydrolyzed condensate of the compound (L) is higher as compared to the sea phase (α).

Preferably, the sea phase (α) and the island phase (β) each have a microstructure further. For example, the sea phase (α) may further form a sea-island structure composed of a sea phase (α1) that consists mainly of the neutralized product of the carboxylic acid-containing polymer, and an island phase (α2) that consists mainly of the hydrolyzed condensate of the compound (L). Furthermore, the island phase (β) may further form a sea-island structure composed of a sea phase (β1) that consists mainly of the neutralized product of the carboxylic acid-containing polymer, and an island phase (β2) that consists mainly of the hydrolyzed condensate of the compound (L). Preferably, the ratio (volume ratio) of [the island phase (β2)/the sea phase (β1)] in the island phase (β) is larger than that of [the island phase (α2)/the sea phase (α1)] in the sea phase (α). The diameter of the island phase (β) is preferably in the range of 30 nm to 1200 nm, more preferably in the range of 50 to 500 nm, further preferably in the range of 50 nm to 400 nm. The diameter of each of the island phase (β2) and the island phase (α2) is preferably 50 nm or less, more preferably 30 nm or less, further preferably 20 nm or less.

In order to obtain a structure as mentioned above, moderate hydrolysis and condensation of the compound (L) need to occur prior to the crosslinking reaction between the compound (L) and the carboxylic acid-containing polymer. For this, it is possible to employ the methods of using a specific compound (L) together with the carboxylic acid-containing polymer in a suitable ratio; allowing the compound (L) to be subjected to hydrolysis and condensation before mixing it with the carboxylic acid-containing polymer; and using a suitable hydrolysis-condensation catalyst, for example.

Further, it has been found that, when specific production conditions are employed, a layered region with a high proportion of the hydrolyzed condensate of the compound (L) is formed on the surface of the gas barrier layer. Hereinafter, the layer of the hydrolyzed condensate of the compound (L) formed on the surface of the gas barrier layer may be referred to as a "skin layer". The formation of the skin layer improves the water resistance of the surface of the gas barrier layer. The skin layer formed of the hydrolyzed condensate of the compound (L) gives hydrophobic properties to the surface of the gas barrier layer, and gives, to the gas barrier layered product, properties that prevent the gas barrier layers stacked in a water-wet state from adhering to each other. Further, it is surprising that, even when the skin layer having hydrophobic properties is formed on the surface of the gas barrier layer, the wettability of the surface by, for example, a printing ink is still good. The presence or absence of the skin layer on the gas barrier layer or the state of the skin layer to be formed thereon differs depending on the production conditions. As a result of diligent studies, the inventors have found that the contact angle of the gas barrier layer with water and a favorable skin layer are correlated, and a favorable skin layer is formed when the contact angle satisfies the following conditions. When the contact angle of the gas barrier layer with water is less than 20°, the skin layer cannot be formed sufficiently in some cases. In such a case, the surface of the gas barrier layer is easily swelled by water, in which the layered products that have been stacked on each other in a water-wet state may adhere to each other in rare cases. When the contact angle of the gas barrier layer is 20° or more, the skin layer can be formed sufficiently, so that the surface of the gas barrier layer is not swelled by water. Thus, no layers adhere. The contact angle of the gas barrier layer with water is preferably 24° or more, further preferably 26° or more. Further, when the contact angle is more than 65°, the thickness of the skin layer increases excessively, and thus the transparency of the gas barrier layered product decreases. Accordingly, the contact angle is preferably 65° or less, more preferably 60° or less, further preferably 58° or less.

Besides the base and the gas barrier layer, the gas barrier layered product of the present invention may also include another layer (for example, a thermoplastic resin film or paper). The addition of such another layer can give heat sealing properties to the gas barrier layered product or can improve the mechanical properties of the gas barrier layered product.

Examples of the gas barrier layered product of the present invention in the case of using a thermoplastic resin film or paper (a layer) as the base are indicated below. In the following examples, in order to simplify the description, the word "film (layer)" may be omitted and only materials thereof are indicated in some cases.

Examples of the structure of the gas barrier layered product according to the present invention include:
(1) gas barrier layer/polyester/polyamide/polyolefin;
(2) gas barrier layer/polyester/gas barrier layer/polyamide/polyolefin;
(3) polyester/gas barrier layer/polyamide/polyolefin;
(4) gas barrier layer/polyamide/polyester/polyolefin;
(5) gas barrier layer/polyamide/gas barrier layer/polyester/polyolefin;
(6) polyamide/gas barrier layer/polyester/polyolefin;
(7) gas barrier layer/polyolefin/polyamide/polyolefin;
(8) gas barrier layer/polyolefin/gas barrier layer/polyamide/polyolefin;
(9) polyolefin/gas barrier layer/polyamide/polyolefin;
(10) gas barrier layer/polyolefin/polyolefin;
(11) gas barrier layer/polyolefin/gas barrier layer/polyolefin;
(12) polyolefin/gas barrier layer/polyolefin;
(13) gas barrier layer/polyester/polyolefin;
(14) gas barrier layer/polyester/gas barrier layer/polyolefin;
(15) polyester/gas barrier layer/polyolefin;
(16) gas barrier layer/polyamide/polyolefin;
(17) gas barrier layer/polyamide/gas barrier layer/polyolefin;
(18) polyamide/gas barrier layer/polyolefin;
(19) gas barrier/polyester/paper;
(20) gas barrier layer/polyamide/paper;
(21) gas barrier layer/polyolefin/paper;
(22) polyethylene (PE) layer/paper layer/PE layer/gas barrier layer/polyethylene terephthalate (PET) layer/PE layer;
(23) polyethylene (PE) layer/paper layer/PE layer/gas barrier layer/polyamide layer/PE layer;
(24) PE layer/paper layer/PE layer/gas barrier layer/PE;
(25) paper layer/PE layer/gas barrier layer/PET layer/PE layer;
(26) PE layer/paper layer/gas barrier layer/PE layer;
(27) paper layer/gas barrier layer/PET layer/PE layer;
(28) paper layer/gas barrier layer/PE layer;
(29) gas barrier layer/paper layer/PE layer;
(30) gas barrier layer/PET layer/paper layer/PE layer;
(31) PE layer/paper layer/PE layer/gas barrier layer/PE layer/a hydroxyl group-containing polymer layer;
(32) PE layer/paper layer/PE layer/gas barrier layer/PE layer/polyamide layer; and
(33) PE layer/paper layer/PE layer/gas barrier layer/PE layer/polyester layer.

From the viewpoints of the heat sealing properties and mechanical properties of the gas barrier layered product, polypropylene or polyethylene is preferred as the polyolefin, polyethylene terephthalate (PET) is preferred as the polyester, and nylon 6 is preferred as the polyamide. Furthermore, an ethylene-vinyl alcohol copolymer is preferred as the hydroxyl group-containing polymer. Another layer, such as an anchor coat layer or a layer formed of an adhesive, may be provided between the layers, as required.

A packaging material can be obtained using the gas barrier layered product of the present invention. This packaging material can be used for various applications. This packaging material is used preferably for the applications that require a barrier against gases such as oxygen gas. For example, the packaging material obtained using the gas barrier layered product of the present invention is used preferably as a packaging material for retort foods. In addition, a paper container can be obtained by using a base containing a paper layer.

<Method for Producing the Gas Barrier Layered Product>

Hereinafter, the method for producing the gas barrier layered product of the present invention is described. According to this method, the gas barrier layered product of the present invention can be produced easily. The materials to be used in the production method of the present invention and the structure of the layered product are the same as those described above. Hence, the same descriptions may be omitted in some cases.

The production method of the present invention includes steps (i) and (ii).

Step (i) is a step in which a layer formed of a composition including the polymer (X) and the hydrolyzed condensate of the compound (L) that contains the hydrolyzable characteristic group is formed on the base. The layer is formed directly on the base, or formed on the base via another layer. The compound (L) includes the compound (A) and the compound (B). It should be noted that the reactivity of the compound (L) in the hydrolysis and condensation can be controlled by adding a compound (D) containing a carboxyl group and having a molecular weight of 100 or less to the compound (L), which allows the gas barrier layered product having good gas barrier properties and hot-water resistance to be obtained. The compound (D) will be described in detail later.

The compound (A) and the compound (B), and the proportion of these compounds are the same as described for the composition that forms the gas barrier layer.

Step (ii) is a step in which the layer that has been formed in step (i) is brought into contact with a solution that contains a metal ion having a valence of at least two (hereinafter, this step may be referred to as an ionization step). Step (ii) can be carried out by spraying the solution that contains the metal ion having a valence of at least two on the layer that has been formed, or immersing both the base and the layer formed on the base in the solution that contains the metal ion having a valence of at least two, for example. At least part of the —COO— group contained in the functional group (F) of the polymer (X) is neutralized by step (ii).

Hereinafter, step (i) is described in detail. When the carboxylic acid-containing polymer and the compound (L) that has not been hydrolyzed and condensed are mixed together, they may react with each other, thereby making it difficult to apply the solution (U). Therefore, it is exceptionally preferred that step (i) include the steps of:

(i-a) preparing a solution (S) that includes at least one type of compound selected from the compound (A) and the partially hydrolyzed condensate of the compound (A), and the compound (D) containing a carboxyl group and having a molecular weight of 100 or less;

(i-b) preparing a solution (T) by mixing the solution (S) with at least one type of compound selected from the compound (B) and the partially hydrolyzed condensate of the compound (B);

(i-c) forming, in the solution (T), a hydrolyzed condensate (oligomer (V)) of a plurality of the compounds (L) that include the compound (A) and the compound (B);

(i-d) preparing the solution (U) by mixing the polymer (X) with the solution (T) that has been subjected to step (i-c); and (i-e) forming a layer by coating the base with the solution (U) and drying it.

More specifically, the oligomer (V) obtained by hydrolyzing and condensing the compounds (L) is at least one metal element-containing compound selected from the partial hydrolysate of the compounds (L), the total hydrolysate of the compounds (L), the partially hydrolyzed condensate of the compounds (L), and the partial condensate of the total hydrolysate of the compounds (L). Hereinafter, such a metal element-containing compound may be referred to as a "compound (L)-based component". Step (i-a), step (i-b), step (i-c), step (i-d) and step (i-e) are more specifically described below.

Step (i-a) is a step in which the compound (A) included in the compound (L) is hydrolyzed and condensed under specific conditions. The compound (A) is hydrolyzed and condensed preferably in a reaction system that includes the compound (A), an acid catalyst, water, and if necessary, an organic solvent. Specifically, the technique that is used in a known sol-gel method can be used. In the hydrolysis and condensation, it is exceptionally preferred that the compound (D) containing a carboxyl group and having a molecular weight of 100 or less (hereinafter, referred to simply as the compound (D) in some cases) be added thereto so that the reaction can be controlled. The addition of the compound (D) can prevent gelation in the step of the hydrolysis and condensation of the compound (A).

The compound (D) is added to a metal element-containing compound that includes at least one selected from the compound (A), the partial hydrolysate of the compound (A), the total hydrolysate of the compound (A), the partially hydrolyzed condensate of the compound (A), and the partial condensate of the total hydrolysate of the compound (A) (hereinafter, this metal element-containing compound may be referred to as a "compound (A)-based component" in some cases), so that the compound (D) acts on the compound (A)-based component. Thus, the above-mentioned effects take place. The method for adding the compound (D) is not particularly limited as long as the addition can be carried out before the compound (A)-based component gelates due to the hydrolysis and condensation reactions. However, preferred examples of the method include the following. First, the compound (D), water, and if necessary, an organic solvent are mixed to prepare an aqueous solution of the compound (D). Subsequently, the aqueous solution of the compound (D) is added to the compound (A)-based component, thereby allowing the solution (S) in which the compound (D) has acted on the compound (A)-based component to be obtained. Although there is no limitation on the amount of water to be mixed with the compound (D), the ratio of [the number of moles of water]/[the number of moles of the compound (D)] is preferably in the range of 25/1 to 300/1, more preferably in the range of 50/1 to 200/1, further preferably in the range of 75/1 to 150/1, in order to obtain the uniform solution (S) with a high concentration.

With regard to the use amount of the compound (D), the ratio of [the number of moles of the compound (D)]/[the number of moles of the compound (A)] is preferably in the range of 0.25/1 to 30/1, more preferably in the range of 0.5/1 to 20/1, further preferably in the range of 0.75/1 to 10/1 because such a range provides better reaction control of the compound (A) and better gas barrier properties of the gas barrier layered product of the present invention.

The compound (D) is not particularly limited as long as it is a compound containing a carboxyl group and having a molecular weight of 100 or less. In order to increase the reaction rate of the compound (A) with the functional group (F) of the polymer (X) and achieve the gas barrier layered product of the present invention with good hot-water resistance and gas barrier properties, acetic acid, propionic acid, hexanoic acid, and the like can be used as the compound (D), of which acetic acid is most preferred.

In step (i-b), the solution (T) is prepared. Specifically, the solution (T) can be prepared, for example, using a method in which the solution (S) and if necessary, an organic solvent are added to the compound (B) that serves as a constituent component of the compound (L) and thereafter, an acid catalyst, water and if necessary, an organic solvent are added thereto.

In step (i-c), for example, hydrolysis and condensation reactions are carried out in a reaction system that includes the compound (A)-based component, the compound (B), an acid catalyst, water, and if necessary, an organic solvent. The technique that is used in a known sol-gel method can be used therefor. Thus, it is possible to obtain a solution of a metal element-containing compound that includes at least one selected from the compound (A)-based component, the compound (B), the partial hydrolysate of the compound (B), the total hydrolysate of the compound (B), the partially hydrolyzed condensate of the compound (B), and the partial condensate of the total hydrolysate of the compound (B).

Such steps involved in the reaction can prevent gel generation at the time of preparing the oligomer (V), and further allow the reactivity of the oligomer (V) to be controlled. Therefore, it is possible to prevent gelation at the time of mixing the oligomer (V) with the polymer (X).

A known acid can be used as the acid catalyst in step (i-a) and step (i-b). Examples thereof include hydrochloric acid, sulfuric acid, nitric acid, p-toluenesulfonic acid, benzoic acid, acetic acid, lactic acid, butyric acid, carbonic acid, oxalic acid, and maleic acid. Among them, hydrochloric acid, sulfuric acid, nitric acid, acetic acid, lactic acid, and butanoic acid are particularly preferred. A preferred amount of the acid catalyst to be used varies depending on the type of acid to be used. However, with respect to 1 mol of the metal atom in the compound (L), the amount of the acid catalyst is preferably in the range of $1\times10^{-5}$ to 10 mol, more preferably in the range of $1\times10^{-4}$ to 5 mol, further preferably in the range of $5\times10^{-4}$ to 1 mol. When the amount of the acid catalyst to be used is in this range, a gas barrier layered product with high gas barrier properties can be obtained.

The amount of water to be used in step (i-a) and step (i-b) varies depending on the type of compound (L). However, with respect to 1 equivalent of the hydrolyzable characteristic group in the compound (L), the amount of water to be used is preferably in the range of 0.05 to 10 equivalents, more preferably in the range of 0.1 to 5 equivalents, further preferably in the range of the 0.2 to 3 equivalents. When the amount of water to be used is in this range, a gas barrier layered product to be obtained has particularly excellent gas barrier properties. In step (i-a) and step (i-b), in the case of using a component that contains water such as hydrochloric acid, it is preferred that the amount of water to be used be determined in consideration of the amount of water to be introduced by the component.

Furthermore, in step (i-a) and step (i-b), an organic solvent may be used, as needed. The organic solvent to be used is not particularly limited, as long as the compound (L) can be dissolved therein. For example, alcohols such as methanol, ethanol, isopropanol, and normal propanol can be used suitably as the organic solvent. Alcohol having a molecular structure of the same type as the alkoxy group (an alkoxy component) contained in the compound (L) can be used more suitably. Specifically, methanol is preferred with respect to tetramethoxysilane, while ethanol is preferred with respect to tetraethoxysilane. The amount of the organic solvent to be used is not particularly limited. However, the amount of the organic solvent to be used is adjusted so that the concentration of the compound (L) is 1 to 90 wt %, more preferably 10 to 80 wt %, further preferably 10 to 60 wt %.

In step (i-a), step (i-b) and step (i-c), the temperature of the reaction system to be employed for the hydrolysis and condensation of the compound (L) in the reaction system is not necessarily limited. However, the temperature of the reaction system is normally in the range of 2 to 100° C., preferably in the range of 4 to 60° C., further preferably in the range of 6 to 50° C. The reaction time varies depending on the reaction conditions such as the amount and type of the acid catalyst. However, the reaction time is normally in the range of 0.01 to 60 hours, preferably in the range of 0.1 to 12 hours, and more preferably in the range of 0.1 to 6 hours. Further, the reaction may be performed in an atmosphere of various gases such as air, carbon dioxide, nitrogen, and argon.

Step (i-d) is a step of preparing the solution (U) by mixing the carboxylic acid-containing polymer (=polymer (X)) with the solution (T) that contains the oligomer (V) obtained in step (i-c). The solution (U) can be prepared using the solution (T), the carboxylic acid-containing polymer, and if necessary, water and/or an organic solvent. For example, it is possible to employ a method of adding the solution (T) to a solution in which the carboxylic-acid containing polymer has been dissolved, and mixing it. It is also possible to employ a method of adding a solution in which the carboxylic-acid containing polymer has been dissolved in water or an organic solvent to the solution (T) and mixing it. In both methods, the solution (T) or the solution in which the carboxylic-acid containing polymer has been dissolved to be added may be added at a time, or added at several times.

The solution in which the carboxylic acid-containing polymer has been dissolved to be used in step (i-d) can be prepared using the following method. The solvent to be used can be selected depending on the type of carboxylic acid-containing polymer. For example, in the case of a water-soluble polymer such as polyacrylic acid and polymethacrylic acid, water is preferred. In the case of a polymer such as an isobutylene-maleic anhydride copolymer and a styrene-maleic anhydride copolymer, water that contains an alkaline substance such as ammonia, sodium hydroxide, or potassium hydroxide is preferred. Moreover, alcohols such as methanol, and ethanol; ethers such as tetrahydrofuran, dioxane, and trioxane; ketones such as acetone, and methyl ethyl ketone; glycols such as ethylene glycol, and propylene glycol; glycol derivatives such as methyl cellosolve, ethyl cellosolve, and n-butyl cellosolve; glycerin; acetonitrile; dimethylformamide; dimethylsulfoxide; sulfolane; dimethoxyethane, etc. can be used in combination as long as they do not prevent the carboxylic acid-containing polymer from dissolving.

In the carboxylic acid-containing polymer contained in the solution (U), part (for example, 0.1 to 10 mol %) of the —COO— group contained in the functional group (F) may be neutralized with a monovalent ion. The degree of the neutralization of the functional group (F) with the monovalent ion is more preferably in the range of 0.5 to 5 mol %, further preferably in the range of 0.7 to 3 mol % because the gas barrier layered product having good transparency can be obtained. Examples of the monovalent ion include ammonium ion, pyridinium ion, sodium ion, potassium ion, and lithium ion, of which ammonium ion is preferred.

In view of the preservation stability of the solution (U) and the application properties of the solution (U) onto the base, the solid content concentration of the solution (U) is preferably in the range of 3 wt % to 20 wt %, more preferably in the range of 4 wt % to 15 wt %, further preferably in the range of 5 wt % to 12 wt %.

In view of the preservation stability of the solution (U) and the gas barrier properties of the gas barrier layered product, the pH of the solution (U) is preferably in the range of 1.0 to 7.0, more preferably in the range of 1.0 to 6.0, further preferably in the range of 1.5 to 4.0.

The pH of the solution (U) can be adjusted using a known method. For example, it can be adjusted by adding: an acidic compound such as hydrochloric acid, nitric acid, sulfuric acid, phosphoric acid, acetic acid, butanoic acid, and ammonium sulfate; and a basic compound such as sodium hydroxide, potassium hydroxide, ammonia, trimethylamine, pyridine, sodium carbonate, and sodium acetate. In this case, the use of a basic compound that introduces a monovalent cation into the solution brings about an effect that part of the carboxyl group and/or carboxylic acid anhydride group in the carboxylic acid-containing polymer can be neutralized with the monovalent ion.

Step (i-e) is described. The state of the solution (U) prepared in step (i-d) changes with time and finally the solution (U) becomes a gel composition. The time required for gelation of the solution (U) depends on the composition of the solution (U). In order to apply the solution (U) steadily to a base, it is preferred that the solution (U) have a stable viscosity over a long period of time, which then increases gradually. Preferably, the composition of the solution (U) is adjusted so that its viscosity measured with a Brookfield viscometer (B-type viscosity meter: 60 rpm) is 1 N·s/m$^2$ or less (more preferably 0.5 N·s/m$^2$ or less, particularly preferably 0.2 N·s/m$^2$ or less), even after the solution (U) is allowed to stand still at 25° C. for 2 days, as assessed by reference to the time when the entire amount of the compound (L)-based component has been added. Furthermore, it is more preferred that the composition of the solution (U) be adjusted so that its viscosity is 1 N·s/m$^2$ or less (more preferably 0.1 N·s/m$^2$ or less, particularly preferably 0.05 N·s/m$^2$ or less), even after the solution (U) is allowed to stand still at 25° C. for 10 days. Further preferably, the composition of the solution (U) is adjusted so that its viscosity is 1 N·s/m$^2$ or less (more preferably 0.1 N·s/m$^2$ or less, particularly preferably 0.05 N·s/m$^2$ or less), even after the solution (U) is allowed to stand still at 50° C. for 10 days. When the viscosity of the solution (U) is in the above-mentioned ranges, the solution (U) has excellent storage stability and the gas barrier layered product to be obtained tends to have better gas barrier properties in many cases.

In order to adjust the viscosity of the solution (U) to fall within the above-mentioned ranges, it is possible to employ the methods, for example, of adjusting the concentration of the solid content; adjusting the pH; and adding a viscosity modifier such as carboxymethyl cellulose, starch, bentonite, tragacanth gum, stearate, alginate, methanol, ethanol, n-propanol, and isopropanol.

In order to facilitate the application of the solution (U) to the base, an organic solvent that can be mixed uniformly with the solution (U) may be added to the solution (U) as long as the stability of the solution (U) is not impaired. Examples of the organic solvent that can be added include: alcohols such as methanol, ethanol, n-propanol, and isopropanol; ethers such as tetrahydrofuran, dioxane, and trioxane; ketones such as acetone, methyl ethyl ketone, methyl vinyl ketone, and methyl isopropyl ketone; glycols such as ethylene glycol, and propylene glycol; glycol derivatives such as methyl cellosolve, ethyl cellosolve, and n-butyl cellosolve; glycerin; acetonitrile; dimethylformamide; dimethylacetamide; dimethylsulfoxide; sulfolane; and dimethoxyethane.

As long as the effects of the present invention are not impaired, the solution (U) may also include, if desired: inorganic acid metal salts such as carbonate, hydrochloride, nitrate, hydrogen carbonate, sulfate, hydrogen sulfate, phosphate, borate, and aluminate; organic acid metal salts such as oxalate, acetate, tartrate, and stearate; metal complexes such as an acetylacetonato metal complex, e.g., aluminum acetylacetonato, a cyclopentadienyl metal complex, e.g., titanocene, and a cyano metal complex; a layered clay compound; a crosslinker; the above-mentioned compound (P) containing at least two amino groups; the above-mentioned compound (Q) containing at least two hydroxyl groups; polymeric compounds other than those; a plasticizer; an antioxidant; an ultraviolet absorber; and a flame retardant. Further, the solution (U) may also contain fine powder of a metal oxide, fine silica powder, etc.

The solution (U) prepared in step (i-d) is applied to at least one surface of the base in step (i-e). Before the application of the solution (U), the surface of the base may be treated with a known anchor coating agent, or a known adhesive may be applied to the surface of the base. The method for applying the solution (U) to the base is not particularly limited and a known method can be employed. Preferred examples of the method include casting, dipping, roll coating, gravure coating, screen printing, reverse coating, spray coating, kiss coating, die coating, metering rod coating, chamber doctor coating, and curtain coating.

After the application of the solution (U) to the base in step (i-e), the solvent contained in the solution (U) is removed and thereby a layered product (layered product (I)) before the ionization step can be obtained. The method for removing the solvent is not particularly limited and a known method can be used. Specifically, a method such as hot-air drying, hot roll contact drying, infrared heating, or microwave heating can be used individually or in combination. The drying temperature is not particularly limited as long as it is lower than the flow initiation temperature of the base by at least 15 to 20° C. and is also lower than the thermal decomposition initiation temperature of the carboxylic acid-containing polymer by at least 15 to 20° C. The drying temperature is preferably in the range of 70° C. to 200° C., more preferably in the range of 80 to 180° C., further preferably in the range of 90 to 160° C. The solvent can be removed under either normal pressure or reduced pressure.

In the gas barrier layered product of the present invention, a skin layer formed of the hydrolyzed condensate of the compound (L) is preferably formed on the surface of the gas barrier layer. Further, as has been described above, an excessive thickness of the skin layer deteriorates the transparency of the gas barrier layered product, which is not preferred. A method for forming a skin layer with an appropriate thickness is described below. According to a result of diligent studies by the inventors, the occurrence or non-occurrence of the formation of a skin layer and the state of the formation of the skin layer depend on the reactivity of the hydrolyzed condensate of the compound (L), the composition of the compound (L), the solvent used for the solution (U), the drying speed of the solution (U) after being applied to the base, and the like. For example, it is possible to increase the contact angle of water with respect to the surface of the gas barrier layer (that is, to form an appropriate skin layer) by measuring the contact angle and increasing the reaction time in step (i-a) and step (i-c) on the condition that the contact angle is less than the predetermined range mentioned above. Conversely, when the contact angle is more than the predetermined range, the reaction time in step (i-a) and step (i-c) should be shortened, thereby decreasing the contact angle.

The layered product (I) obtained by the above-mentioned steps is brought into contact with a solution (hereinafter also referred to as a "solution (IW)" in some cases) that contains a metal ion having a valence of at least two, in step (ii) (ionization step). Thus, the gas barrier layered product (layered product (II)) of the present invention is obtained. The ionization step may be carried out at any stage, as long as the effects of the present invention are not impaired. The ionization step can be carried out before or after the layered product is processed into the form of a packaging material, or after the packaging material is filled with contents and then is sealed, for example.

The solution (IW) can be prepared by dissolving, in a solvent, a compound (polyvalent metal compound) that releases the metal ion having a valence of at least two upon dissolution. The solvent to be used for preparing the solution (IW) is desirably water but may be a mixture of water and an organic solvent that can be mixed with water. Examples of such an organic solvent include: alcohols such as methanol, ethanol, n-propanol, and isopropanol; ethers such as tetrahydrofuran, dioxane, and trioxane; ketones such as acetone, methyl ethyl ketone, methyl vinyl ketone, and methyl isopropyl ketone; glycols such as ethylene glycol, and propylene glycol; glycol derivatives such as methyl cellosolve, ethyl cellosolve, and n-butyl cellosolve; glycerin; acetonitrile; dimethylformamide; dimethylacetamide; dimethylsulfoxide; sulfolane; and dimethoxyethane.

As a polyvalent metal compound, it is possible to use a compound that releases the metal ion (that is, the metal ion having a valence of at least two), which has been exemplified in relation to the gas barrier layered product of the present invention. Examples thereof include: calcium acetate, calcium hydroxide, barium hydroxide, calcium chloride, calcium nitrate, calcium carbonate, magnesium acetate, magnesium hydroxide, magnesium chloride, magnesium carbonate, iron(II) acetate, iron(II) chloride, iron(III) acetate, iron(III) chloride, zinc acetate, zinc chloride, copper(II) acetate, copper(III) acetate, lead acetate, mercury(II) acetate, barium acetate, zirconium acetate, barium chloride, barium sulfate, nickel sulfate, lead sulfate, zirconium chloride, zirconium nitrate, aluminum sulfate, potassium alum $(KAl(SO_4)_2)$, and titanium(IV) sulfate. Only one of the polyvalent metal compounds may be used or two or more of them may be used in combination. Preferred examples of the polyvalent metal compound include calcium acetate, calcium hydroxide, magnesium acetate, and zinc acetate. These polyvalent metal compounds may be used in the form of a hydrate.

The concentration of the polyvalent metal compound in the solution (IW) is not particularly limited, but is preferably in the range of $5 \times 10^{-4}$ wt % to 50 wt %, more preferably in the range of $1 \times 10^{-2}$ wt % to 30 wt %, further preferably in the range of 1 wt % to 20 wt %.

When the layered product (I) is brought into contact with the solution (IW), the temperature of the solution (IW) is not particularly limited. However, the higher the temperature, the higher the ionization rate of the carboxyl group-containing polymer. The temperature is, for example, in the range of 30 to 140° C., and is preferably in the range of 40° C. to 120° C., more preferably in the range of 50° C. to 100° C.

Desirably, after the layered product (I) is brought into contact with the solution (IW), the residual solvent in the layered product is removed. The method for removing the solvent is not particularly limited. A known method can be used. Specifically, one of drying methods such as hot-air drying, hot roll contact drying, infrared heating, or microwave heating can be used individually, or two or more of them can be used in combination. The temperature at which the solvent is removed is not particularly limited as long as it is lower than the flow initiation temperature of the base by at least 15 to 20° C. and is also lower than the thermal decomposition initiation temperature of the carboxylic acid-containing polymer by at least 15 to 20° C. The drying temperature is preferably in the range of 40 to 200° C., more preferably in the range of 60 to 150° C., further preferably in the range of 80 to 130° C. The solvent can be removed under either normal pressure or reduced pressure.

In order not to impair the appearance of the surface of the gas barrier layered product, it is preferred that the excess of the polyvalent metal compound that has deposited on the surface of the layered product be removed before or after the removal of the solvent. As a method for removing the polyvalent metal compound, washing with a solvent capable of dissolving the polyvalent metal compound is preferred. A solvent that can be used for the solution (IW) can be employed as the solvent capable of dissolving the polyvalent metal compound. It is preferred that the same solvent as used for the solution (IW) be used.

The production method of the present invention may further include a step of heat treating the layer formed in step (i) at a temperature of 120 to 240° C., after step (i) and before and/or after step (ii). That is, the layered product (I) or (II) may be heat treated. The heat treatment can be carried out at any stage after the solvent of the applied solution (U) has been removed almost completely. However, a gas barrier layered product with good surface appearance can be obtained by heat treating the layered product before being subjected to the ionization step (that is, the layered product (I)). The temperature of the heat treatment is preferably in the range of 120° C. to 240° C., more preferably in the range of 140 to 240° C., further preferably in the range of 160° C. to 220° C. The heat treatment can be carried out in an atmosphere of air, nitrogen, argon, etc.

In the production method of the present invention, the layered product (I) or (II) may be irradiated with ultraviolet rays. The ultraviolet irradiation may be carried out anytime after the removal of the solvent in the applied solution (U) has been almost completed. The method of the ultraviolet irradiation is not particularly limited. A known method can be used. The wavelength of the ultraviolet rays to be employed for the irradiation is preferably in the range of 170 to 250 nm, more preferably in the range of 170 to 190 nm and/or in the range of 230 to 250 nm. Furthermore, instead of the ultraviolet irradiation, irradiation with radiation of electron beams, gamma rays, or the like may be carried out.

Only either one of the heat treatment and the ultraviolet irradiation may be carried out, or both may be used in combination. The heat treatment and/or the ultraviolet irradiation can cause the layered product to develop a higher level of the gas barrier performance in some cases.

The surface of the base may be subjected to a treatment (such as a treatment with an anchor coating agent, or coating with an adhesive) before the application of the solution (U) so that the adhesive layer (H) is disposed between the base and the gas barrier layer. In this case, it is preferred that an aging process in which the base with the solution (U) applied is allowed to stand at a relatively low temperature for a long period of time be carried out after step (i) (the application of the solution (U)) but before the above-mentioned heat treatment and step (ii) (ionization step). The temperature of the aging process is preferably in the range of 30 to 200° C., more preferably in the range of 30 to 150° C., further preferably in the range of 30 to 120° C. The duration of the aging process is preferably in the range of 0.5 to 10 days, more preferably in the range of 1 to 7 days, further preferably in the range of 1 to 5 days. The adhesiveness between the base and the gas barrier layer is further improved due to such an aging process. It is preferred that the above-mentioned heat treatment (heat treatment at 120° C. to 240° C.) further be carried out after this aging process.

The gas barrier layered product of the present invention has excellent barrier properties against gases such as oxygen, carbon dioxide, nitrogen, etc. It can maintain the excellent barrier properties at a high level even under high humidity conditions or after being in a bending state. In addition, even after being subjected to retorting, it exhibits excellent gas barrier properties. Thus, the gas barrier layered product of the present invention has good gas barrier properties independent of the environmental conditions such as humidity, and it exhibits excellent gas barrier properties even after being in a bending state. Therefore, the gas barrier layered product of the present invention can be used in various applications. For instance, the gas barrier layered product of the present invention is particularly useful as a food packaging material (particularly a packaging material for retort foods). The gas barrier layered product of the present invention can be also used as a material for packaging chemicals such as agricultural chemicals and medicines, industrial materials such as precision materials, garments, etc.

EXAMPLES

Hereinafter, the present invention is described further in detail with reference to examples. However, the present invention is not limited to these examples.

The measurements and evaluations that were carried out in the following examples were performed using the following methods (1) to (9). Some of the abbreviations used in the following descriptions for the measurement methods and evaluation methods may be described later. The measurement results and evaluation results are indicated in the tables that appear after the descriptions of Examples and Comparative Examples.

(1) Oxygen Barrier Properties Before Retorting

The oxygen permeability was measured using an oxygen permeability analyzer ("MOCON OX-TRAN 2/20", manufactured by Modern Controls, Inc.). The oxygen permeability (unit: $cc/m^2/day/atm$) ($cc=cm^3$) was determined at a temperature of 20° C., an oxygen pressure of 1 atm, and a career gas pressure of 1 atm. Nitrogen gas containing 2 vol % of hydrogen gas was used as a carrier gas. At this time, humidity was adjusted to 85% RH, and the humidity on the oxygen supply side was the same as that on the career gas side. The layered product that has only one surface of a base formed with the gas barrier layer was positioned so that the gas barrier layer faced the oxygen supply side while the base faced the carrier gas side.

(2) Oxygen Barrier Properties after 10% Elongation but Before Retorting

First, the layered product was cut out into 30 cm×21 cm. Next, the cut layered product was stretched at 10% in an atmosphere of 23° C. and 50% RH using a manual stretching device, which was kept for 5 minutes in the stretched state. Thereafter, the oxygen permeability was determined in the same manner as above.

(3) Contact Angle

The layered product was subjected to humidity conditioning in an atmosphere of a temperature of 20° C. and a humidity of 65% RH for 24 hours. Thereafter, 2 μL of water was dropped on the gas barrier layer using an automatic contact angle meter (DM500, manufactured by Kyowa Interface Science Co., Ltd.) in an atmosphere of a temperature of 20° C. and a humidity of 65% RH. Then, the contact angle of the gas barrier layer with water was measured using a method according to Japanese Industrial Standards (JIS)-R3257.

(4) Tensile Strength and Elongation, and Young's Modulus

The layered product was subjected to humidity conditioning in an atmosphere of a temperature of 23° C. and a humidity of 50% RH for 24 hours. Thereafter, the layered product was cut out into 15 cm×15 mm in the MD direction and the TD direction. The tensile strength and elongation, and Young's modulus of the thus cut layered product were measured in an atmosphere of a temperature of 23° C., and a humidity of 50% RH using a method according to JIS-K7127.

(5) Dry Heat Shrinkage Ratio

The layered product was cut out into 10 cm×10 cm, the length of which in the MD and TD was measured with a slide caliper. The layered product was allowed to stand in a dryer to be heated at 80° C. for 5 minutes, and then its length in the MD and TD after heating was measured. Thereafter, the dry heat shrinkage ratio (%) was calculated from the following formula:

Dry heat shrinkage ratio (%)=$(l_b-l_a)\times 100/l_b$, where $l_b$ denotes the length before heating, and $l_a$ denotes the length after heating.

(6) Neutralization Degree (Ionization Degree) of Carboxyl Group with Metal Ion

<Calculation of Ionization Degree Using FT-IR>

Polyacrylic acid with a number average molecular weight of 150,000 was dissolved in distilled water, and the carboxyl group was neutralized with a predetermined amount of sodium hydroxide. An aqueous solution of the neutralized product of the polyacrylic acid thus obtained was applied to a base to the same thickness as the gas barrier layer of the layered product for which the degree of ionization was to be determined, followed by drying. The base used herein was a stretched nylon film (Emblem ON-BC (product name), with a thickness of 15 μm, manufactured by Unitika Ltd., which hereinafter may be abbreviated as "ON") having a surface coated with a two-component anchor coating agent (TAKELAC 626 and TAKENATE A50 (product name), manufactured by MITSUI TAKEDA CHEMICALS INC., which hereinafter may be abbreviated as "AC"). Thus, standard samples of the layered product (the layer formed of the neutralized product of polyacrylic acid/AC/ON) were produced. The neutralization degrees of the carboxyl group of the standard samples were 0, 25, 50, 75, 80, and 90 mol %. With respect to these samples, the infrared absorption spectrum was measured using a Fourier transform infrared spectrophotometer (Spectrum One, manufactured by PerkinElmer, Inc.) in the mode of ATR (attenuated total reflection). Then, the ratio of the maximum absorbance was calculated from the two peaks attributed to the stretching vibration of C=O contained in the layer formed of the neutralized product of polyacrylic acid, i.e. the peak observed in the range of 1600 cm$^{-1}$ to 1850 cm$^{-1}$ and the peak observed in the range of 1500 cm$^{-1}$ to 1600 cm$^{-1}$. Using the calculated ratio and the degree of ionization of each standard sample, a standard curve 1 was plotted.

The peaks of the stretching vibration of C=O contained in the gas barrier layer were measured using a Fourier transform infrared spectrophotometer (Spectrum One, manufactured by PerkinElmer, Inc.) in the mode of ATR (attenuated total reflection) for the layered product that used a stretched nylon film (the above-mentioned "ON") as a base. The peak attributed to the stretching vibration of C=O of the carboxyl group in the carboxylic acid-containing polymer before ionization was observed in the range of 1600 cm$^{-1}$ to 1850 cm$^{-1}$. Further, the stretching vibration of C=O of the carboxyl group after ionization was observed in the range of 1500 cm$^{-1}$ to 1600 cm$^{-1}$. Then, the ratios thereof were calculated from the maximum absorbance in each range. Subsequently, the degree of ionization was determined using the ratios and the above-mentioned standard curve 1.

<Calculation of Ionization Degree Using X-Ray Fluorescence>

Standard samples each having a different ionization degree were fabricated for the layered product that used the aforementioned "ON" as a base, according to the measurement results of FT-IR. Specifically, 11 types of standard samples each having a different ionization degree (ion: calcium ion) by approximately 10 mol % varying from 0 to 100 mol % were fabricated. For each sample, the X-ray fluorescence intensity of calcium element was measured using a wavelength dispersive X-ray fluorescence spectrometer (ZSX mini II, manufactured by Rigaku Corporation) and a standard curve 2 was plotted from the degree of ionization determined in advance using FT-IR. The degree of ionization with calcium ion was calculated using the standard curve 2 obtained for each of the layered products that had been fabricated under various conditions.

Also in the case where other metals (such as magnesium ion and zinc ion) were used for the ionization, the same method as above was employed for plotting a standard curve 2 to calculate the degree of ionization.

Also for layered products using a base other than the "ON" (such as PET), the standard curve 2 obtained from the measurement of the X-ray fluorescence intensity was used to calculate the degree of ionization.

(7) Weight of Hydrolyzed Condensate and the Polymer (X)

The total of the weight of the inorganic component derived from the compound (L), the weight of the organic component derived from the compound (L) and the weight of the organic component derived from the polymer (X) was calculated using the above-mentioned method.

(8) Oxygen Barrier Properties after Retorting

Two laminates (size: 12 cm×12 cm) were fabricated. Then, the two laminates were stacked together so that each of the non-stretched polypropylene films (RXC-18 (product name), with a thickness of 50 μm, manufactured by TOHCELLO CO., LTD., which hereinafter may be abbreviated as "CPP") faces the inside, and 3 sides of the laminates were heat sealed with 5 mm from each edge. 80 g of distilled water was poured between the two laminates that had been heat sealed and then the remaining fourth side was heat sealed in the same manner. Thus, a pouch containing the distilled water therein was produced.

Next, the pouch was put into a retort sterilizer (Flavor Ace RCS-60, manufactured by HISAKA WORKS, LTD.) to be subjected to retorting at 120° C. and 0.15 MPa, for 30 minutes. After retorting, the heating was stopped. The pouch was taken out from the retort sterilizer at the time when the temperature inside the retort sterilizer reached 60° C. Thereafter, the pouch was allowed to stand in a room at 20° C. and 65% RH for 1 hour. Thereafter, the heat sealed portions were cut off by scissors, and the laminates were brought into light contact with a paper towel to remove the water remaining on the surfaces thereof. Thereafter, the pouch was allowed to stand in a desiccator that had been adjusted to 20° C. and 85% RH for at least one day. The oxygen barrier properties after retorting were evaluated by measuring the oxygen permeability of the laminates that had been subjected to retorting in this way.

The oxygen permeability was measured using the oxygen permeability analyzer ("MOCON OX-TRAN 2/20", manufactured by Modern Controls, Inc.). Specifically, the layered product was positioned so that the gas barrier layer faced the oxygen supply side while the CPP faced the carrier gas side. Then, the oxygen permeability (unit: cc/m$^2$/day/atm) was measured in an atmosphere of a temperature of 20° C., a humidity on the oxygen supply side of 85% RH, a humidity on the carrier gas side of 85% RH, an oxygen pressure of 1 atm, and a career gas pressure of 1 atm.

(9) Appearance after Retorting

First, a pouch was produced in the same manner as one that had been used for determining the oxygen barrier properties after retorting. This pouch was subjected to retorting at 135° C. and 0.25 MPa, for 60 minutes. After retorting, the heating was stopped. The pouch was taken out from the retort sterilizer at the time when the internal temperature reached 60° C. Thereafter, the pouch was allowed to stand in a room at 20° C. and 65% RH for 1 hour. Then, the appearance was observed and determined as "very good (S)" in the case of no haze being observed as before retorting, "good (A)" in the case of slight haze being observed but no practical problem, and "poor (B)" in the case of obvious haze being observed as compared to before retorting.

The following Examples each were compared to Reference Examples 1 and 2. In spite of having a thinner coating layer, the layered product of each of Examples before and after retorting exhibited oxygen barrier properties equivalent to or exceeding those of the layered products of Reference Examples 1 and 2, and thus had excellent gas barrier properties and hot-water resistance. Furthermore, the layered product of each Example had a tensile strength and elongation, and a Young's modulus close to the performance of the base film itself shown in Reference Examples 3 and 4. Further, the layered product of each Example had an improved dry heat shrinkage ratio compared to the layered products of Reference Examples 1 and 2. That is, the layered product of each Example had excellent processability. Further, when being subjected to retorting under severe conditions, the layered products of Reference Examples 1 and 2 showed a slight change in the appearance, while the layered products of Examples showed no change in the appearance, and the layered products of Examples exhibited excellent hot-water resistance.

In Examples 1 and 2, the reaction time in the preparation of the mixed solution (T) was 1 hour, and in the subsequent Examples, the reaction time was 5 hours. The contact angle of the gas barrier layer was increased by extending the reaction time from 1 hour to 5 hours, resulting in an increase in thickness of the skin layer. Since the skin layer had an increased thickness, no gas barrier layers adhered to each other even when a pouch filled with a content having a weight of 5 kg, which was not common, was subjected to retorting under severe conditions and thereafter the gas barrier layers in a wet state were stacked.

Example 1

Polyacrylic acid (PAA) with a number average molecular weight of 150,000 was dissolved in distilled water, and thereby a PAA aqueous solution with a solid content concentration of 13 wt % was obtained. Subsequently, a 13% ammonia aqueous solution was added to this PAA aqueous solution so that 1 mol % of the carboxyl group in PAA should be neutralized. Thus, a partially neutralized PAA aqueous solution was obtained.

60 parts by weight of acetic acid and 1800 parts by weight of distilled water were mixed to produce an acetic acid aqueous solution to which 204 parts by weight of aluminum isopropoxide (AIP) (AIP/acetic acid/distilled water=1/1/100 (molar ratio)) was added under stirring. Thereafter, it was heated at 80° C. for 1 hour. Thus, an AIP aqueous solution (S1) with a concentration of 9.88 wt % was obtained.

Subsequently, a mixed solution (U1) was prepared so that the molar ratio of Al/Si was 1.2/98.8, and the weight ratio of [the inorganic component derived from tetramethoxysilane (TMOS) and AIP]/[the partially neutralized product of PAA] was 40.2/59.8. Specifically, first, 50 parts by weight of TMOS was dissolved in 50 parts by weight of methanol, and 8.5 parts by weight of the above-mentioned 9.88 wt % AIP aqueous solution (S1) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 1 hour. Thus, a mixed solution (T1) was obtained. Subsequently, the mixed solution (T1) was diluted with 425 parts by weight of distilled water and 222 parts by weight of methanol, and thereafter 228 parts by weight of the aqueous solution of the partially neutralized product of PAA (concentration: 13 wt %) was rapidly added thereto under stirring. Thus, the mixed solution (U1) with a solid content concentration of 5 wt % was obtained.

Furthermore, a stretched polyethylene terephthalate film (Lumirror P60 (product name), with a thickness of 12 μm, manufactured by Toray Industries, Inc., which hereinafter may be abbreviated as "PET") was coated with a two-component anchor coating agent (1 part by weight of TAKELAC A-626 (product name) and 2 parts by weight of TAKENATE A-50 (product name), manufactured by MITSUI TAKEDA CHEMICALS INC.) that had been dissolved in 67 parts by weight of ethyl acetate, followed by drying. Thus, a base (AC(0.1 μm)/PET(12 μm)) having an anchor coat layer was produced. This anchor coat layer of the base was coated with the mixed solution (U1) using a bar coater to form a layer so that the layer would have a thickness of 0.4 μm after drying. This was dried at 120° C. for 5 minutes. Subsequently, the opposite surface of the base was also coated in the same manner. The resultant layered product was aged at 40° C. for 3 days. Next, the layered product was subjected to heat treatment at 180° C. for 5 minutes using a dryer. Then, the layered product was immersed in a 2 wt % calcium acetate aqueous solution (85° C.) for 12 seconds, and thereafter was dried at 110° C. for 1 minute. Thus, a layered product (A1) having a structure of gas barrier layer (0.4 μm)/AC (0.1 μm)/PET (12 μm)/AC (0.1 μm)/gas barrier layer (0.4 μm) was obtained. The degree of ionization, the oxygen permeability before retorting, the contact angle, the tensile strength and elongation, the Young's modulus, and the dry heat shrinkage ratio of the layered product (A1) were measured using the above-mentioned methods.

Subsequently, the stretched nylon film (the above-mentioned "ON") and the non-stretched polypropylene film (the above-mentioned "CPP") each were coated with a two-component adhesive (A-385 (product name) and A-50 (product name), manufactured by MITSUI TAKEDA CHEMICALS INC.), followed by drying. Then, these films and the layered product (A1) were laminated. Thus, a laminate (1) having the structure of gas barrier layer/AC/PET/AC/gas barrier layer/adhesive/ON/adhesive/CPP was obtained. The oxygen permeability and the appearance of this laminate after retorting were evaluated using the above-mentioned methods.

Example 2

An aqueous solution of the partially neutralized product of PAA and an AIP aqueous solution were prepared in the same manner as in Example 1. Subsequently, a mixed solution (U2) was prepared so that the molar ratio of Al/Si was 30.1/69.9, and the weight ratio of [the inorganic component derived from TMOS and AIP]/[the partially neutralized product of PAA] was 25.5/74.5. Specifically, first, 50 parts by weight of TMOS was dissolved in 50 parts by weight of methanol, and 293 parts by weight of the above-mentioned 9.88 wt % AIP aqueous solution (S2) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 1 hour. Thus, a mixed solution (T2) was obtained. Subsequently, the mixed solution (T2) was diluted with 850 parts by weight of distilled water and 405 parts by weight of methanol, and thereafter 607 parts by weight of the aqueous solution of the partially neutralized product of PAA (concentration: 13 wt %) was rapidly added thereto under stirring. Thus, the mixed solution (U2) with a solid content concentration of 5 wt % was obtained.

Using the mixed solution (U2), coating, heat treatment, ionization and drying were carried out in the same manner as in Example 1. Thus, a layered product (A2) was obtained. Subsequently, lamination was carried out in the same manner as in Example 1. Thus, a laminate (2) was obtained. The layered product and the laminate were evaluated in the same manner as in Example 1.

As the compound (A), an Al compound, a Ti compound and a Zr compound were used respectively in Examples 3 to 5. Even if any of these compounds were used, high gas barrier properties and hot-water resistance were exhibited. However, the Al compound was excellent in that it achieved better gas barrier properties before and after retorting.

Example 3

An aqueous solution of the partially neutralized product of PAA and an AIP aqueous solution were prepared in the same manner as in Example 1. A mixed solution (U3) was prepared, only varying the reaction time.

Specifically, first, 50 parts by weight of TMOS was dissolved in 50 parts by weight of methanol, and 8.5 parts by weight of the above-mentioned 9.88 wt % AIP aqueous solution (S3) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T3) was obtained. Subsequently, the mixed solution (T3) was diluted with 425 parts by weight of distilled water and 222 parts by weight of methanol, and thereafter 228 parts by weight of the aqueous solution of the partially neutralized product of PAA (concentration: 13 wt %) was rapidly added thereto under stirring. Thus, the mixed solution (U3) with a solid content concentration of 5 wt % was obtained. Using the mixed solution (U3), coating, heat treatment, ionization and drying were carried out in the same manner as in Example 1. Thus, a layered product (A3) was obtained. Subsequently, lamination was carried out in the same manner as in Example 1. Thus, a laminate (3) was obtained. The layered product and the laminate were evaluated in the same manner as in Example 1.

Example 4

A mixed solution (U4) was prepared using titanium tetraisopropoxide (TIP) instead of AIP. Specifically, 1200 parts by weight of acetic acid and 1800 parts by weight of distilled water were mixed to produce an acetic acid aqueous solution to which 284 parts by weight of TIP (TIP/acetic acid/distilled water=1/20/100 (molar ratio)) was added under stirring. Thereafter, it was heated at 80° C. for 1 hour. Thus, a TIP aqueous solution (S4) with a concentration of 8.6 wt % was obtained. Subsequently, 50 parts by weight of TMOS was dissolved in 50 parts by weight of methanol, and 13.5 parts by weight of the TIP aqueous solution (S4) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T4) was obtained. Subsequently, a mixed solution (U4) with a solid content concentration of 5 wt % was obtained with the same composition and in the same manner as in Example 1.

Using the mixed solution (U4), coating, heat treatment, ionization and drying were carried out in the same manner as in Example 1. Thus, a layered product (A4) was obtained. Subsequently, lamination was carried out in the same manner as in Example 1. Thus, a laminate (4) was obtained. The layered product and the laminate were evaluated in the same manner as in Example 1.

Example 5

A mixed solution (U5) was prepared using zirconium tetraisopropoxide (ZIP) instead of AIP. Specifically, 1200 parts by weight of acetic acid and 1800 parts by weight of distilled water were mixed to produce an acetic acid aqueous solution to which 327 parts by weight of ZIP (ZIP/acetic acid/distilled water=1/20/100 (molar ratio)) was added under stirring. Thereafter, it was heated at 80° C. for 1 hour. Thus, a ZIP aqueous solution (S5) with a concentration of 9.8 wt % was obtained. Subsequently, 50 parts by weight of TMOS was dissolved in 50 parts by weight of methanol, and 13.6 parts by weight of the above-mentioned 9.8 wt % ZIP aqueous solution (S5) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T5) was obtained. Subsequently, a mixed solution (U5) with a solid content concentration of 5 wt % was obtained with the same composition and in the same manner as in Example 1.

Using the mixed solution (U5), coating, heat treatment, ionization and drying were carried out in the same manner as in Example 1. Thus, a layered product (A5) was obtained. Subsequently, lamination was carried out in the same manner as in Example 1. Thus, a laminate (5) was obtained. The layered product and the laminate were evaluated in the same manner as in Example 1.

In Examples 6 to 12, the ratio of [the number of moles of $M^1$ atom derived from the compound (A)]/[the number of moles of Si atom derived from the compound (B)] was varied.

Examples 9 to 12 demonstrated that the ratio of [the number of moles of $M^1$ atom derived from the compound (A)]/[the number of moles of Si atom derived from the compound (B)] in the range of 0.1/99.9 to 30.0/70.0 allowed high hot-water resistance and gas barrier properties to be exhibited. When $M^1$ exceeded this range, the gas barrier properties before and after retorting deteriorated. When it was less than the range, the hot-water resistance decreased, resulting in a reduction in the oxygen barrier properties after retorting (Comparative Examples 5 and 6). For better gas barrier properties, the ratio of [the number of moles of $M^1$ atom derived from the compound (A)]/[the number of moles of Si atom derived from the compound (B)] was preferably in the range of 1.2/98.8 to 30.0/70.0 (see Example 6), more preferably in the range of 1.9/98.1 to 30.0/70.0 (see Example 7), further preferably in the range of 2.8/97.2 to 30.0/70.0 (see Example 8).

Example 6

An aqueous solution of the partially neutralized product of PAA and an AIP aqueous solution were prepared in the same manner as in Example 1. Then, a mixed solution (U6) was prepared at the same starting material ratio as in Example 3 except that the weight ratio of [the inorganic component derived from TMOS and AIP]/[the partially neutralized product of PAA] was adjusted to 30.2/69.8. Specifically, first, a mixed solution (T6) was prepared with the same composition and in the same manner as in the mixed solution (T3) of Example 3. Then, the mixed solution (T6) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Thus, the mixed solution (U6) with a solid content concentration of 5 wt % was obtained.

Using the mixed solution (U6), coating, heat treatment, ionization and drying were carried out in the same manner as in Example 1. Thus, a layered product (A6) was obtained. Subsequently, lamination was carried out in the same manner as in Example 1. Thus, a laminate (6) was obtained. The layered product and the laminate were evaluated in the same manner as in Example 1.

Example 7

An aqueous solution of the partially neutralized product of PAA and an AIP aqueous solution were prepared in the same manner as in Example 1. Then, a mixed solution (U7) was prepared at the same starting material ratio as in Example 6 except that the molar ratio of Al/Si was adjusted to 1.9/98.1. Specifically, 50 parts by weight of TMOS was dissolved in 50 parts by weight of methanol, and 13.2 parts by weight of the 9.88 wt % AIP aqueous solution (S7) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T7) was obtained. Subsequently, a mixed solution (U7) with a solid content concentration of 5 wt % was obtained with the same composition and in the same manner as in Example 6.

Using the mixed solution (U7), coating, heat treatment, ionization and drying were carried out in the same manner as in Example 1. Thus, a layered product (A7) was obtained. Subsequently, lamination was carried out in the same manner as in Example 1. Thus, a laminate (7) was obtained. The layered product and the laminate were evaluated in the same manner as in Example 1. Furthermore, the oxygen permeability after 10% elongation was also measured.

Example 8

An aqueous solution of the partially neutralized product of PAA and an AIP aqueous solution were prepared in the same manner as in Example 1. Then, a mixed solution (U8) was prepared at the same starting material ratio as in Example 6 except that the molar ratio of Al/Si was adjusted to 2.8/97.2. Specifically, 50 parts by weight of TMOS was dissolved in 50 parts by weight of methanol, and 19.8 parts by weight of the 9.88 wt % AIP aqueous solution (S8) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T8) was obtained. Subsequently, a mixed solution (U8) with a solid content concentration of 5 wt % was obtained with the same composition and in the same manner as in Example 6.

Using the mixed solution (U8), coating, heat treatment, ionization and drying were carried out in the same manner as in Example 1. Thus, a layered product (A8) was obtained. Subsequently, lamination was carried out in the same manner as in Example 1. Thus, a laminate (8) was obtained. The layered product and the laminate were evaluated in the same manner as in Example 1.

Example 9

An aqueous solution of the partially neutralized product of PAA and an AIP aqueous solution were prepared in the same manner as in Example 1. Then, a mixed solution (U9) was prepared at the same starting material ratio as in Example 2, that is, the molar ratio of Al/Si was 30/70 and the weight ratio of [the inorganic component derived from TMOS and AIP]/[the partially neutralized product of PAA] was 25.5/74.5. Specifically, first, 50 parts by weight of TMOS was dissolved in 50 parts by weight of methanol, and 293 parts by weight of the 9.88 wt % AIP aqueous solution (S9) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T9) was obtained. Subsequently, the resultant mixed solution (T9) was diluted with 850 parts by weight of distilled water and 405 parts by weight of methanol, and thereafter 607 parts by weight of the aqueous solution of the partially neutralized product of PAA (concentration: 13 wt %) was rapidly added thereto under stirring. Thus, the mixed solution (U9) with a solid content concentration of 5 wt % was obtained.

Using the mixed solution (U9), coating, heat treatment, ionization and drying were carried out in the same manner as in Example 1. Thus, a layered product (A9) was obtained. Subsequently, lamination was carried out in the same manner as in Example 1. Thus, a laminate (9) was obtained. The layered product and the laminate were evaluated in the same manner as in Example 1.

Example 10

An aqueous solution of the partially neutralized product of PAA and an AIP aqueous solution were prepared in the same manner as in Example 1. Then, a mixed solution (U10) was prepared so that the molar ratio of Al/Si was 0.1/99.9 and the weight ratio of [the inorganic component derived from TMOS and AIP]/[the partially neutralized product of PAA] was 80.0/20.0. Specifically, first, 50 parts by weight of TMOS was dissolved in 50 parts by weight of methanol, and 0.7 part by weight of the 9.88 wt % AIP aqueous solution (S10) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T10) was obtained. Subsequently, the mixed solution (T10) was diluted with 212 parts by weight of distilled water and 131 parts by weight of methanol, and thereafter 38 parts by weight of the aqueous solution of the partially neutralized product of PAA (concentration: 13 wt %) was rapidly added thereto under stirring. Thus, the mixed solution (U10) with a solid content concentration of 5 wt % was obtained.

Using the mixed solution (U10), coating, heat treatment, ionization and drying were carried out in the same manner as in Example 1. Thus, a layered product (A10) was obtained. Subsequently, lamination was carried out in the same manner as in Example 1. Thus, a laminate (10) was obtained. The layered product and the laminate were evaluated in the same manner as in Example 1.

Example 11

An aqueous solution of the partially neutralized product of PAA and an AIP aqueous solution were prepared in the same manner as in Example 1. Then, a mixed solution (U11) was prepared so that the molar ratio of Al/Si was 29.9/70.1 and the weight ratio of [the inorganic component derived from TMOS and AIP]/[the partially neutralized product of PAA] was 36.9/63.1. Specifically, first, 50 parts by weight of TMOS was dissolved in 50 parts by weight of methanol, and 290 parts by weight of the 9.88 wt % AIP aqueous solution (S11) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T11) was obtained. Subsequently, the mixed solution (T11) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Thus, the mixed solution (U11) with a solid content concentration of 5 wt % was obtained.

Using the mixed solution (U11), coating, heat treatment, ionization and drying were carried out in the same manner as in Example 1. Thus, a layered product (A11) was obtained. Subsequently, lamination was carried out in the same manner as in Example 1. Thus, a laminate (11) was obtained. The layered product and the laminate were evaluated in the same manner as in Example 1.

Example 12

An aqueous solution of the partially neutralized product of PAA and an AIP aqueous solution were prepared in the same manner as in Example 1. Then, a mixed solution (U12) was prepared so that the molar ratio of Al/Si was 0.1/99.9 and the weight ratio of [the inorganic component derived from TMOS and AIP]/[the partially neutralized product of PAA] was 70.0/30.0. Specifically, first, 50 parts by weight of TMOS was dissolved in 50 parts by weight of methanol, and 0.7 part by weight of the 9.88 wt % AIP aqueous solution (S12) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T12) was obtained. Subsequently, the mixed solution (T12) was diluted with 243 parts by weight of distilled water and 144 parts by weight of methanol, and thereafter 65 parts by weight of the aqueous solution of the partially neutralized product of PAA (concentration: 13 wt %) was rapidly added thereto under stirring. Thus, the mixed solution (U12) with a solid content concentration of 5 wt % was obtained.

Using the mixed solution (U12), coating, heat treatment, ionization and drying were carried out in the same manner as in Example 1. Thus, a layered product (A12) was obtained. Subsequently, lamination was carried out in the same manner as in Example 1. Thus, a laminate (12) was obtained. The layered product and the laminate were evaluated in the same manner as in Example 1.

In Examples 8 and 13 to 17, the ratio of [the weight of the inorganic component derived from the compound (L)]/[the total of the weight of the organic component derived from the compound (L) and the weight of the organic component derived from the polymer (X)] was varied.

For better hot-water resistance and gas barrier properties of the gas barrier layered product, the ratio of [the weight of the inorganic component derived from the compound (L)]/[the total of the weight of the organic component derived from the compound (L) and the weight of the organic component derived from the polymer (X)] was preferably in the range of 20.0/80.0 to 80.0/20.0 (see Examples 13, 14, 16, and 17), more preferably in the range of 30.5/69.5 to 70.0/30.0 (see Examples 8 and 15).

Example 13

An aqueous solution of the partially neutralized product of PAA and an AIP aqueous solution were prepared in the same manner as in Example 1. Then, a mixed solution (U13) was prepared so that the molar ratio of Al/Si was 3.0/97.0 and the weight ratio of [the inorganic component derived from TMOS and AIP]/[the partially neutralized product of PAA] was 20.0/80.0. Specifically, first, 50 parts by weight of TMOS was dissolved in 50 parts by weight of methanol, and 20.8 parts by weight of the 9.88 wt % AIP aqueous solution (S13) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T13) was obtained. Subsequently, the mixed solution (T13) was diluted with 868 parts by weight of distilled water and 412 parts by weight of methanol, and thereafter 623 parts by weight of the aqueous solution of the partially neutralized product of PAA (concentration: 13 wt %) was rapidly added thereto under stirring. Thus, the mixed solution (U13) with a solid content concentration of 5 wt % was obtained.

Using the mixed solution (U13), coating, heat treatment, ionization and drying were carried out in the same manner as in Example 1. Thus, a layered product (A13) was obtained. Subsequently, lamination was carried out in the same manner as in Example 1. Thus, a laminate (13) was obtained. The layered product and the laminate were evaluated in the same manner as in Example 1.

Example 14

An aqueous solution of the partially neutralized product of PAA and an AIP aqueous solution were prepared in the same manner as in Example 1. Then, a mixed solution (U14) was prepared so that the molar ratio of Al/Si was 3.0/97.0 and the weight ratio of [the inorganic component derived from TMOS and AIP]/[the partially neutralized product of PAA] was 80.0/20.0. Specifically, first, 50 parts by weight of TMOS was dissolved in 50 parts by weight of methanol, and 21.0 parts by weight of the 9.88 wt % AIP aqueous solution (S14) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T14) was obtained. Subsequently, the mixed solution (T14) was diluted with 214 parts by weight of distilled water and 132 parts by weight of methanol, and thereafter 39 parts by weight of the aqueous solution of the partially neutralized product of PAA (concentration: 13 wt %) was rapidly added thereto under stirring. Thus, the mixed solution (U14) with a solid content concentration of 5 wt % was obtained.

Using the mixed solution (U14), coating, heat treatment, ionization and drying were carried out in the same manner as in Example 1. Thus, a layered product (A14) was obtained. Subsequently, lamination was carried out in the same manner as in Example 1. Thus, a laminate (14) was obtained. The layered product and the laminate were evaluated in the same manner as in Example 1.

Example 15

An aqueous solution of the partially neutralized product of PAA and an AIP aqueous solution were prepared in the same manner as in Example 1. Then, a mixed solution (U15) was prepared so that the molar ratio of Al/Si was 3.0/97.0 and the weight ratio of [the inorganic component derived from TMOS and AIP]/[the partially neutralized product of PAA] was 70.0/30.0. Specifically, first, 50 parts by weight of TMOS was dissolved in 50 parts by weight of methanol, and 21.1 parts by weight of the 9.88 wt % AIP aqueous solution (S15) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T15) was obtained. Subsequently, the mixed solution (T15) was diluted with 245 parts by weight of distilled water and 145 parts by weight of methanol, and thereafter 67 parts by weight of the aqueous solution of the partially neutralized product of PAA (concentration: 13 wt %) was rapidly added thereto under stirring. Thus, the mixed solution (U15) with a solid content concentration of 5 wt % was obtained.

Using the mixed solution (U15), coating, heat treatment, ionization and drying were carried out in the same manner as in Example 1. Thus, a layered product (A15) was obtained. Subsequently, lamination was carried out in the same manner as in Example 1. Thus, a laminate (15) was obtained. The layered product and the laminate were evaluated in the same manner as in Example 1.

Example 16

An aqueous solution of the partially neutralized product of PAA and an AIP aqueous solution were prepared in the same manner as in Example 1. Then, a mixed solution (U16) was prepared so that the molar ratio of Al/Si was 2.9/97.1, and the weight ratio of [the inorganic component derived from TMOS and AIP]/[the partially neutralized product of PAA] was 10.2/89.8. Specifically, first, 50 parts by weight of TMOS was dissolved in 50 parts by weight of methanol, and 20.3 parts by weight of the 9.88 wt % AIP aqueous solution (S16) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T16) was obtained. Subsequently, the mixed solution (T16) was diluted with 1700 parts by weight of distilled water and 769 parts by weight of methanol, and thereafter 1366 parts by weight of the aqueous solution of the partially neutralized product of PAA (concentration: 13 wt %) was rapidly added thereto under stirring. Thus, the mixed solution (U13) with a solid content concentration of 5 wt % was obtained.

Using the mixed solution (U16), coating, heat treatment, ionization and drying were carried out in the same manner as in Example 1. Thus, a layered product (A16) was obtained. Subsequently, lamination was carried out in the same manner as in Example 1. Thus, a laminate (16) was obtained. The layered product and the laminate were evaluated in the same manner as in Example 1.

Example 17

An aqueous solution of the partially neutralized product of PAA and an AIP aqueous solution were prepared in the same manner as in Example 1. Then, a mixed solution (U17) was prepared so that the molar ratio of Al/Si was 3.0/97.0 and the weight ratio of [the inorganic component derived from TMOS and AIP]/[the partially neutralized product of PAA] was 90.2/9.8. Specifically, first, 50 parts by weight of TMOS was dissolved in 50 parts by weight of methanol, and 21.3 parts by weight of the 9.88 wt % AIP aqueous solution (S17) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T17) was obtained. Subsequently, the mixed solution (T17) was diluted with 189 parts by weight of distilled water and 121 parts by weight of methanol, and thereafter 17 parts by weight of the aqueous solution of the partially neutralized product of PAA (concentration: 13 wt %) was rapidly added thereto under stirring. Thus, the mixed solution (U17) with a solid content concentration of 5 wt % was obtained.

Using the mixed solution (U17), coating, heat treatment, ionization and drying were carried out in the same manner as in Example 1. Thus, a layered product (A17) was obtained. Subsequently, lamination was carried out in the same manner as in Example 1. Thus, a laminate (17) was obtained. The layered product and the laminate were evaluated in the same manner as in Example 1.

In Examples 18 to 23, the ratio of [the number of moles of the compound expressed by Formula (II)]/[the number of moles of the compound expressed by Formula (III)] was varied.

Examples 18, 19, 22, and 23 demonstrated that the ratio of [the number of moles of the compound expressed by Formula (II)]/[the number of moles of the compound expressed by Formula (III)] was preferably in the range of 99.5/0.5 to 80.0/20.0 for achieving good hot-water resistance and gas barrier properties. When the compound expressed by Formula (III) was less than this range, the hot-water resistance decreased. When it exceeded the range, the gas barrier properties deteriorated. For better hot-water resistance and gas barrier properties, the above-mentioned ratio was more preferably in the range of 98.0/2.0 to 89.9/10.1 (see Examples 20 and 21).

Example 18

An aqueous solution of the partially neutralized product of PAA and an AIP aqueous solution were prepared in the same manner as in Example 1. Subsequently, a mixed solution (U18) was prepared so that the molar ratio of TMOS/gamma-glycidoxypropyltrimethoxysilane (GPTMOS) was 99.5/0.5, the molar ratio of Al/Si was 2.8/97.2, and the weight ratio of [the inorganic component derived from TMOS, AIP and GPTMOS]/[the organic component of GPTMOS and the partially neutralized product of PAA] was 30.5/69.5. Specifically, first, 49.6 parts by weight of TMOS and 0.4 part by weight of GPTMOS were dissolved in 50 parts by weight of methanol, and 19.6 parts by weight of the 9.88 wt % AIP aqueous solution (S18) that had been prepared in the same manner as in Example 1 was added thereto. Then, 3.3 parts by weight of distilled water and 8.2 parts by weight of 0.1 N hydrochloric acid were added thereto so that the ratio of water with respect to the total of TMOS and GPTMOS should be 1.95 molar equivalent, and the resultant solution was subjected to hydrolysis and condensation reactions at 10° C. for 5 hours. Thus, a mixed solution (T18) was obtained. Subsequently, the mixed solution (T18) was diluted with 566 parts by weight of distilled water and 283 parts by weight of methanol, and thereafter 352 parts by weight of the aqueous solution of the partially neutralized product of PAA (concentration: 13 wt %) was rapidly added thereto under stirring. Thus, the mixed solution (U18) with a solid content concentration of 5 wt % was obtained.

Using the mixed solution (U18), coating, heat treatment, ionization and drying were carried out in the same manner as in Example 1. Thus, a layered product (A18) was obtained. Subsequently, lamination was carried out in the same manner as in Example 1. Thus, a laminate (18) was obtained. The layered product and the laminate were evaluated in the same manner as in Example 1.

Example 19

A mixed solution (U19) was obtained at the same starting material ratio as in Example 18 except that the molar ratio of TMOS/GPTMOS was adjusted to 80.0/20.0. Specifically, first, 36.0 parts by weight of TMOS and 14.0 parts by weight of GPTMOS were dissolved in 50 parts by weight of methanol, and 19.8 parts by weight of the 9.88 wt % AIP aqueous solution (S19) was added thereto. Then, 3.0 parts by weight of distilled water and 7.4 parts by weight of 0.1 N hydrochloric acid were added thereto so that the ratio of water with respect to the total of TMOS and GPTMOS should be 1.95 molar equivalent, and the resultant solution was subjected to hydrolysis and condensation reactions at 10° C. for 5 hours. Thus, a mixed solution (T19) was obtained. Subsequently, the mixed solution (T19) was diluted with 520 parts by weight of distilled water and 302 parts by weight of methanol, and thereafter 267 parts by weight of the aqueous solution of the partially neutralized product of PAA (concentration: 13 wt %) was rapidly added thereto under stirring. Thus, the mixed solution (U19) with a solid content concentration of 5 wt % was obtained.

Using the mixed solution (U19), coating, heat treatment, ionization and drying were carried out in the same manner as in Example 1. Thus, a layered product (A19) was obtained. Subsequently, lamination was carried out in the same manner as in Example 1. Thus, a laminate (19) was obtained. The layered product and the laminate were evaluated in the same manner as in Example 7.

Example 20

An aqueous solution of the partially neutralized product of PAA and an AIP aqueous solution were prepared in the same manner as in Example 1. Subsequently, a mixed solution (U20) was prepared so that the molar ratio of TMOS/GPTMOS was 89.9/10.1, the molar ratio of Al/Si was 3.1/96.9, and the weight ratio of [the inorganic component derived from TMOS, AIP and GPTMOS]/[the organic component of GPTMOS and the partially neutralized product of PAA] was 31.5/68.5. Specifically, first, 42.6 parts by weight of TMOS and 7.4 parts by weight of GPTMOS were dissolved in 50 parts by weight of methanol, and 20.6 parts by weight of the 9.88 wt % AIP aqueous solution (S20) was added thereto. Then, 3.2 parts by weight of distilled water and 7.8 parts by weight of 0.1 N hydrochloric acid were added thereto so that the ratio of water with respect to the total of TMOS and GPTMOS should be 1.95 molar equivalent, and the resultant solution was subjected to hydrolysis and condensation reactions at 10° C. for 5 hours. Thus, a mixed solution (T20) was obtained. Subsequently, the mixed solution (T20) was diluted with 542 parts by weight of distilled water and 302 parts by weight of methanol, and thereafter 293 parts by weight of the aqueous solution of the partially neutralized product of PAA (concentration: 13 wt %) was rapidly added thereto under stirring. Thus, the mixed solution (U20) with a solid content concentration of 5 wt % was obtained.

Using the mixed solution (U20), coating, heat treatment, ionization and drying were carried out in the same manner as in Example 1. Thus, a layered product (A20) was obtained. Subsequently, lamination was carried out in the same manner as in Example 1. Thus, a laminate (20) was obtained. The layered product and the laminate were evaluated in the same manner as in Example 7.

Example 21

A mixed solution (U21) was obtained at the same starting material ratio as in Example 18 except that the molar ratio of TMOS/GPTMOS was adjusted to 98.0/2.0. Specifically, first, 48.5 parts by weight of TMOS and 1.5 parts by weight of GPTMOS were dissolved in 50 parts by weight of methanol, and 19.2 parts by weight of the 9.88 wt % AIP aqueous solution (S21) was added thereto. Then, 3.3 parts by weight of distilled water and 8.1 parts by weight of 0.1 N hydrochloric acid were added thereto so that the ratio of water with respect to the total of TMOS and GPTMOS should be 1.95 molar equivalent, and the resultant solution was subjected to hydrolysis and condensation reactions at 10° C. for 5 hours. Thus, a mixed solution (T21) was obtained. Subsequently, the mixed solution (T21) was diluted with 562 parts by weight of distilled water and 285 parts by weight of methanol, and thereafter 345 parts by weight of the aqueous solution of the partially neutralized product of PAA (concentration: 13 wt %) was rapidly added thereto under stirring. Thus, the mixed solution (U21) with a solid content concentration of 5 wt % was obtained.

Using the mixed solution (U21), coating, heat treatment, ionization and drying were carried out in the same manner as in Example 1. Thus, a layered product (A21) was obtained. Subsequently, lamination was carried out in the same manner as in Example 1. Thus, a laminate (21) was obtained. The layered product and the laminate were evaluated in the same manner as in Example 7.

Example 22

A mixed solution (U22) was obtained at the same starting material ratio as in Example 18 except that the molar ratio of TMOS/GPTMOS was adjusted to 99.9/0.1. Specifically, first, 49.9 parts by weight of TMOS and 0.1 part by weight of GPTMOS were dissolved in 50 parts by weight of methanol, and 21.0 parts by weight of the 9.88 wt % AIP aqueous solution (S22) was added thereto. Then, 3.3 parts by weight of distilled water and 8.1 parts by weight of 0.1 N hydrochloric acid were added thereto so that the ratio of water with respect to the total of TMOS and GPTMOS should be 1.95 molar equivalent, and the resultant solution was subjected to hydrolysis and condensation reactions at 10° C. for 5 hours. Thus, a mixed solution (T22) was obtained. Subsequently, the mixed solution (T22) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Thus, the mixed solution (U22) with a solid content concentration of 5 wt % was obtained.

Using the mixed solution (U22), coating, heat treatment, ionization and drying were carried out in the same manner as in Example 1. Thus, a layered product (A22) was obtained. Subsequently, lamination was carried out in the same manner as in Example 1. Thus, a laminate (22) was obtained. The layered product and the laminate were evaluated in the same manner as in Example 1.

Example 23

A mixed solution (U23) was obtained at the same starting material ratio as in Example 18 except that the molar ratio of TMOS/GPTMOS was adjusted to 70.0/30.0. Specifically, first, 30.0 parts by weight of TMOS and 20.0 parts by weight of GPTMOS were dissolved in 50 parts by weight of methanol, and 17.9 parts by weight of the 9.88 wt % AIP aqueous solution (S23) was added thereto. Then, 2.9 parts by weight of distilled water and 7.0 parts by weight of 0.1 N hydrochloric acid were added thereto so that the ratio of water with respect to the total of TMOS and GPTMOS should be 1.95 molar equivalent, and the resultant solution was subjected to hydrolysis and condensation reactions at 10° C. for 5 hours. Thus, a mixed solution (T23) was obtained. Subsequently, the mixed solution (T23) was diluted with 500 parts by weight of distilled water and 310 parts by weight of methanol, and thereafter 229 parts by weight of the aqueous solution of the partially neutralized product of PAA (concentration: 13 wt %) was rapidly added thereto under stirring. Thus, the mixed solution (U23) with a solid content concentration of 5 wt % was obtained.

Using the mixed solution (U23), coating, heat treatment, ionization and drying were carried out in the same manner as in Example 1. Thus, a layered product (A23) was obtained. Subsequently, lamination was carried out in the same manner as in Example 1. Thus, a laminate (23) was obtained. The layered product and the laminate were evaluated in the same manner as in Example 7.

In Examples 21 and 24 to 26, [the ratio of the —COO— group neutralized with a metal ion having a valence of at least two with respect to the —COO— group contained in the functional group (F)] (the above-described degree of ionization) was varied.

Examples 21 and 24 to 26 demonstrated that, in order to obtain a layered product with excellent gas barrier properties, the degree of ionization was preferably at least 60 mol % but not more than 100 mol %, more preferably at least 80 mol %. Further, the comparison of these Examples with Comparative Example 8 showed that high hot-water resistance and gas barrier properties could not be exhibited when ionization was not carried out.

Example 24

In Example 24, a mixed solution (U24) that had been obtained with the same composition and in the same manner as in the mixed solution (U21) of Example 21 was used. Coating and heat treatment were carried out in the same manner as in Example 1. Thus, a layered product was produced. This layered product was immersed in a 0.1 wt % calcium acetate aqueous solution (85° C.) for 12 seconds to be ionized, and thereafter was dried in the same manner as in Example 1. Thus, a layered product (A24) was obtained.

Subsequently, lamination was carried out in the same manner as in Example 1. Thus, a laminate (24) was obtained. The layered product and the laminate were evaluated in the same manner as in Example 1.

Example 25

In Example 25, a mixed solution (U25) that had been obtained with the same composition and in the same manner as in the mixed solution (U21) of Example 21 was used. Coating and heat treatment were carried out in the same manner as in Example 1. Thus, a layered product was produced. This layered product was immersed in a 0.2 wt % calcium acetate aqueous solution (85° C.) for 6 seconds to be ionized, and thereafter was dried in the same manner as in Example 1. Thus, a layered product (A25) was obtained.

Subsequently, lamination was carried out in the same manner as in Example 1. Thus, a laminate (25) was obtained. The layered product and the laminate were evaluated in the same manner as in Example 1.

Example 26

In Example 26, a mixed solution (U26) that had been obtained with the same composition and in the same manner as in the mixed solution (U21) of Example 21 was used.

Coating and heat treatment were carried out in the same manner as in Example 1. Thus, a layered product was produced. This layered product was immersed in a 0.2 wt % calcium acetate aqueous solution (85° C.) for 12 seconds to be ionized, and thereafter was dried in the same manner as in Example 1. Thus, a layered product (A26) was obtained.

Subsequently, lamination was carried out in the same manner as in Example 1. Thus, a laminate (26) was obtained. The layered product and the laminate were evaluated in the same manner as in Example 1.

In Examples 21, 27 and 28, the type of metal ion having a valence of at least two to be used for the neutralization (ionization) of the functional group (F) contained in the polymer (X) (=the carboxylic acid-containing polymer) was varied. These Examples showed that the ionization with a metal ion having a valence of at least two, such as Ca, Mg, and Zn, allowed high hot-water resistance and gas barrier properties to be exhibited.

Example 27

In Example 27, a mixed solution (U27) that had been obtained with the same composition and in the same manner as in the mixed solution (U21) of Example 21 was used. Coating and heat treatment were carried out in the same manner as in Example 1. Thus, a layered product was produced. This layered product was immersed in a 2 wt % magnesium acetate aqueous solution (85° C.) for 12 seconds to be ionized, and thereafter was dried in the same manner as in Example 1. Thus, a layered product (A27) was obtained.

Subsequently, lamination was carried out in the same manner as in Example 1. Thus, a laminate (27) was obtained. The layered product and the laminate were evaluated in the same manner as in Example 1.

Example 28

In Example 28, a mixed solution (U28) that had been obtained with the same composition and in the same manner as in the mixed solution (U21) of Example 21 was used. Coating and heat treatment were carried out in the same manner as in Example 1. Thus, a layered product was obtained. This layered product was immersed in a 2 wt % zinc acetate aqueous solution (85° C.) for 12 seconds to be ionized, and thereafter was dried in the same manner as in Example 1. Thus, a layered product (A28) was obtained.

Subsequently, lamination was carried out in the same manner as in Example 1. Thus, a laminate (28) was obtained. The layered product and the laminate were evaluated in the same manner as in Example 1.

The effects of using the compound (P) containing at least two amino groups were evaluated by comparing Example 7 with Example 29. These Examples demonstrated that the use of the compound (P) allowed the hot-water resistance, that is, oxygen barrier properties after retorting, of the layered product to be improved.

Example 29

An aqueous solution of the partially neutralized product of PAA and an AIP aqueous solution were prepared in the same manner as in Example 1. Furthermore, an EDA hydrochloride aqueous solution was obtained by dissolving EDA in 1 N hydrochloric acid so that the molar ratio of ethylene diamine (EDA)/HCl was 1/2. A mixed solution (U29) was prepared at the same starting material ratio as in Example 7 except that the EDA hydrochloride aqueous solution was added so that the equivalent ratio of [the amino groups in EDA]/[the carboxyl group in PAM should be 1.9/100. Specifically, first, a mixed solution (T29) that had been prepared with the same composition and in the same manner as in the mixed solution (T7) of Example 7 was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Further, 12.7 parts by weight of the EDA hydrochloride aqueous solution was added, so that the mixed solution (U29) with a solid content concentration of 5 wt % was obtained.

Using the mixed solution (U29), coating, heat treatment, ionization and drying were carried out in the same manner as in Example 1. Thus, a layered product (A29) was obtained. Subsequently, lamination was carried out in the same manner as in Example 1. Thus, a laminate (29) was obtained. The layered product and the laminate were evaluated in the same manner as in Example 1.

The effects of using the compound (Q) containing at least two hydroxyl groups were evaluated by comparing Example 7 with Example 30. These Examples demonstrated that the use of the compound (Q) allowed the hot-water resistance (that is, oxygen barrier properties after retorting) and the tensile resistance (that is, oxygen barrier properties after being stretched) of the layered product to be improved.

Example 30

An aqueous solution of the partially neutralized product of PAA and an AIP aqueous solution were prepared in the same manner as in Example 1. Furthermore, polyvinyl alcohol (PVA117, manufactured by KURARAY CO., LTD., which hereinafter may be abbreviated as "PVA") was added to distilled water to a concentration of 10 wt %, which then was heated at 85° C. for 3 hours. Thus, a PVA aqueous solution was obtained.

A mixed solution (U27) was obtained at the same starting material ratio as in Example 7 except that the PVA aqueous solution was added so that the equivalent ratio of [the hydroxyl groups in PVA]/[the carboxyl group in PAA] should be 18.2/100. Specifically, first, a mixed solution (T30) that had been prepared with the same composition and in the same manner as in the mixed solution (T7) of Example 7 was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Further, 51 parts by weight of the above-mentioned 10 wt % PVA aqueous solution was added, so that the mixed solution (U30) with a solid content concentration of 5 wt % was obtained.

Using the mixed solution (U30), coating, heat treatment, ionization and drying were carried out in the same manner as in Example 1. Thus, a layered product (A30) was obtained. Subsequently, lamination was carried out in the same manner as in Example 1. Thus, a laminate (30) was obtained. The layered product and the laminate were evaluated in the same manner as in Example 7.

In Examples 21, 31 and 32, the type of compound (D) to be used in preparing the solution (5) was varied. These Examples demonstrated that the use of acetic acid or propionic acid as the compound (D) allowed good gas barrier properties before and after retorting to be achieved.

Example 31

A mixed solution (U31) was prepared at the same starting material ratio as in Example 21 except that propionic acid was used as an acid in preparing an AIP aqueous solution. Specifically, to a propionic acid aqueous solution obtained by mixing 74 parts by weight of propionic acid with 1800 parts by weight of distilled water was added 204 parts by weight of AIP (AIP/propionic acid/distilled water=1/1/100 (molar ratio)) under stirring. Thereafter, it was heated at 80° C. for 1 hour. Thus, an AIP aqueous solution (S31) with a concentration of 9.82 wt % was obtained. A mixed solution (U31) was obtained with the same composition and in the same manner as in the mixed solution (U21) of Example 21 except that this MP aqueous solution (S31) was used.

Using the mixed solution (U31), coating, heat treatment, ionization and drying were carried out in the same manner as in Example 1. Thus, a layered product (A31) was obtained. Subsequently, lamination was carried out in the same manner as in Example 1. Thus, a laminate (31) was obtained. The layered product and the laminate were evaluated in the same manner as in Example 1.

Example 32

A mixed solution (U32) was prepared at the same starting material ratio as in Example 21 except that hexanoic acid was used as an acid in preparing an AIP aqueous solution. Specifically, to a hexanoic acid aqueous solution obtained by mixing 116 parts by weight of hexanoic acid with 1800 parts by weight of distilled water was added 204 parts by weight of AIP (AIP/hexanoic acid/distilled water=1/1/100 (molar ratio)) under stirring. Thereafter, it was heated at 80° C. for 1 hour. Thus, an AIP aqueous solution (S32) with a concentration of 9.62 wt % was obtained. A mixed solution (U32) was obtained with the same composition and in the same manner as in the mixed solution (U21) of Example 21 except that this AIP aqueous solution (S32) was used.

Using the mixed solution (U32), coating, heat treatment, ionization and drying were carried out in the same manner as in Example 1. Thus, a layered product (A32) was obtained. Subsequently, lamination was carried out in the same manner as in Example 1. Thus, a laminate (32) was obtained. The layered product and the laminate were evaluated in the same manner as in Example 1.

Gas barrier layers were formed on both surfaces of the base in Example 21, while a gas barrier layer was formed only on one surface of the base in Example 33. These Examples demonstrated that, although the gas barrier properties of the layered product could slightly decrease when the gas barrier layer was present only on one surface of the base, the Young's modulus of the layered product was close to the Young's modulus of the base (Reference Example 3), which improved the processability of the layered product.

Example 33

In Example 33, a mixed solution (U33) that had been obtained with the same composition and in the same manner as in the mixed solution (U21) of Example 21 was used. Coating, heat treatment, ionization and drying were carried out in the same manner as in Example 1 except that a gas barrier layer was formed only on one surface of the base. Thus, a layered product (A33) was obtained.

Subsequently, a laminate (33) having a structure of PET/AC/gas barrier layer/adhesive/ON/adhesive/CPP was obtained in the same manner as in Example 1. The layered product and the laminate were evaluated in the same manner as in Example 7.

In Examples 34 and 35, the type of base was changed from PET to ON, as compared to Examples 8 and 21. These Examples demonstrated that the use of PET as the base allowed better gas barrier properties to be achieved than the use of ON. Further, it was demonstrated that PET was more suitable for use as the base in view of the gas barrier properties. However, the use of ON as the base of the layered product was advantageous in that excellent processability was achieved because the strength of ON itself made it feasible to simplify the structure of the laminate from a three-layered structure, for example, of layered product/ON/CPP to a two-layered structure, for example, of layered product/CPP.

Example 34

In Example 34, a mixed solution (U34) that had been obtained with the same composition and in the same manner as in the mixed solution (U8) of Example 8 was used. Coating, heat treatment, ionization and drying were carried out in the same manner as in Example 1 except that a stretched nylon film (the above-mentioned "ON") was used as the base. Thus, a layered product (B34) was obtained.

Subsequently, a non-stretched polypropylene film (the above-mentioned "CPP") was coated with a two-component adhesive (A-385 (product name) and A-50 (product name), manufactured by MITSUI TAKEDA CHEMICALS INC.), followed by drying. Then, these were laminated with the layered product (B34). Thus, a laminate (34) having a structure of gas barrier layer/AC/ON/AC/gas barrier layer/adhesive/CPP was obtained. The layered product and the laminate were evaluated in the same manner as in Example 7.

Example 35

In Example 35, a mixed solution (U35) that had been obtained with the same composition and in the same manner as in the mixed solution (U21) of Example 21 was used. Coating, heat treatment, ionization and drying were carried out in the same manner as in Example 34. Thus, a layered product (B35) was obtained.

Subsequently, lamination was carried out in the same manner as in Example 34. Thus, a laminate (35) was obtained. The layered product and the laminate were evaluated in the same manner as in Example 7.

Compared to Example 34 and 35 having a lamination structure of "gas barrier layer/AC/ON/AC/gas barrier layer/adhesive/CPP", Examples 36 and 37 had a lamination structure of "PET/adhesive/gas barrier layer/AC/ON/AC/gas barrier layer/adhesive/CPP". These Examples demonstrated that, in either the case of the gas barrier layered product that used ON as the base being used as a laminate with a two-layered structure or a three-layered structure, the gas barrier properties remained unchanged. Accordingly, it was demonstrated that, in the layered product using ON as the base, the lamination structure could be selected from a two-layered lamination structure and a three-layered lamination structure depending on the required performance.

Example 36

In Example 36, a mixed solution (U36) that had been obtained with the same composition and in the same manner as in the mixed solution (U8) of Example 8 was used. Coating, heat treatment, ionization and drying were carried out in the same manner as in Example 34. Thus, a layered product (B36) was obtained.

Subsequently, a stretched polyethylene terephthalate film (the above-mentioned "PET") and a non-stretched polypropylene film (the above-mentioned "CPP") each were coated with a two-component adhesive (A-385 (product name) and A-50 (product name), manufactured by MITSUI TAKEDA CHEMICALS INC.), followed by drying. Then, these were laminated with the layered product (B36). Thus, a laminate (36) having a structure of PET/adhesive/gas barrier layer/AC/ON/AC/gas barrier layer/adhesive/CPP was obtained. The layered product and the laminate were evaluated in the same manner as in Example 1.

Example 37

In Example 37, a mixed solution (U37) that had been obtained with the same composition and in the same manner as in the mixed solution (U21) of Example 21 was used. Coating, heat treatment, ionization and drying were carried out in the same manner as in Example 34. Thus, a layered product (B37) was obtained.

Subsequently, lamination was carried out in the same manner as in Example 36. Thus, a laminate (37) was obtained. The layered product and the laminate were evaluated in the same manner as in Example 1.

Gas barrier layers were formed on both surfaces of the base in Example 35, while a gas barrier layer was formed only on one surface of the base in Example 38. These Examples demonstrated that, although the gas barrier properties of the layered product could slightly decrease when the gas barrier layer was present only on one surface of the base, the Young's modulus of the layered product was close to the Young's modulus of the base (Reference Example 4), which improved the processability of the layered product.

Example 38

In Example 38, a mixed solution (U38) that had been obtained with the same composition and in the same manner as in the mixed solution (U21) of Example 21 was used. Coating, heat treatment, ionization and drying were carried out in the same manner as in Example 34 except that a gas barrier layer was formed only on one surface of the base. Thus, a layered product (B38) was obtained.

Subsequently, lamination was carried out in the same manner as in Example 34. Thus, a laminate (38) having a structure of gas barrier layer/AC/ON/adhesive/CPP was obtained. The layered product and the laminate were evaluated in the same manner as in Example 1.

The layered products of Reference Examples 1 and 2 used PET and ON respectively as their bases, and were free from the compound (A). Each of the coating layers of Reference Examples 1 and 2 had a thickness of 1 μm. The thicker the coating layer (gas barrier layer) in the layered products, the more excellent the gas barrier properties should be. However, the tensile strength and elongation, and the Young's modulus were considerably different from those of the base film, and the dry heat shrinkage ratio was higher. Thus, the processability decreased. Further, when the compound (A) was not used, the appearance of the pouch decreased upon retorting under severe conditions.

Reference Example 1

In Reference Example 1, a mixed solution (T39) was prepared so that the molar ratio of TMOS/GPTMOS was 89.9/10.1, and the weight ratio of [the inorganic component derived from TMOS and GPTMOS]/[the organic component of GPTMOS and the partially neutralized product of PAA] was 31.5/68.5. Specifically, first, 46 parts by weight of TMOS and 8 parts by weight of GPTMOS were dissolved in 50 parts by weight of methanol. Then, 3.2 parts by weight of distilled water and 7.8 parts by weight of 0.1 N hydrochloric acid were added thereto so that the ratio of water with respect to the total of TMOS and GPTMOS should be 1.95 molar equivalent and pH was 2 or less, and the resultant solution was subjected to hydrolysis and condensation reactions at 10° C. for 5 hours. Thus, a mixed solution (T39) was obtained.

Subsequently, an aqueous solution of the partially neutralized product of PAA was prepared in the same manner as in Example 1. Then, the mixed solution (T39) was diluted with 61 parts by weight of distilled water, and thereafter 308 parts by weight of the aqueous solution of the partially neutralized product of PAA (concentration: 13 wt %) was rapidly added thereto under stirring. Thus, the mixed solution (U39) with a solid content concentration of 13 wt % was obtained.

Furthermore, a stretched polyethylene terephthalate film (the above-mentioned "PET") was coated with a two-component anchor coating agent (1 part by weight of TAKELAC A-626 (product name) and 2 parts by weight of TAKENATE A-50 (product name), manufactured by MITSUI TAKEDA CHEMICALS INC.) that had been dissolved in 67 parts by weight of ethyl acetate, followed by drying. Thus, a base (AC (0.1 μm)/PET (12 μm)) having an anchor coat layer was produced. This anchor coat layer of the base was coated with the mixed solution (U39) using a bar coater to form a layer so that the layer would have a thickness of 1.0 μm after drying. This was dried at 120° C. for 5 minutes. Both surfaces of the base were coated in the same manner, so that a layered product was obtained. This layered product was aged at 40° C. for 3 days. Subsequently, the layered product was subjected to heat treatment at 180° C. for 5 minutes using a dryer. Then, the layered product was immersed in a 2 wt % calcium acetate aqueous solution (85° C.) for 12 seconds, and thereafter was dried at 50° C. for 5 minutes. Thus, a layered product (A39) having a structure of gas barrier layer (1.0 μm)/AC (0.1 μm)/PET (12 μm)/AC (0.1 μm)/gas barrier layer (1.0 μm) was obtained. The gas barrier layer was transparent and colorless and had a very good appearance. The oxygen permeability before retorting, the contact angle, the tensile strength and elongation, the Young's modulus, and the dry heat shrinkage ratio of the layered product (A39) were measured using the above-mentioned methods.

Subsequently, lamination was carried out in the same manner as in Example 1. Thus, a laminate (39) was obtained. The layered product and the laminate were evaluated in the same manner as in Example 7.

Reference Example 2

In Reference Example 2, a mixed solution (U40) that had been obtained with the same composition and in the same manner as in the mixed solution (U39) of Reference Example 1 was used. Coating, heat treatment, ionization and drying were carried out in the same manner as in Example 1 except that ON was used as the base. Thus, a layered product (B40) was obtained.

Subsequently, lamination was carried out in the same manner as in Example 34. Thus, a laminate (40) was obtained. The layered product and the laminate were evaluated in the same manner as in Example 7.

The performance of the base film was also indicated in Reference Examples 3 and 4 so that the difference between the layered product and the base film in the tensile strength and elongation, and the Young's modulus could be checked. As the tensile strength and elongation, and the Young's modulus of the layered product of the present invention got closer to those of the base film, the need to make the processing conditions of the layered product different from the processing conditions of the base film became small, which suggested excellent processability.

Reference Example 3

The performance of the stretched polyethylene terephthalate film (Lumirror P60 (product name), with a thickness of 12 μm, manufactured by Toray Industries, Inc., referred to as "PET") that had been used in Examples, etc. of the present invention was indicated.

Reference Example 4

The performance of the stretched nylon film (Emblem ON-BC (product name), with a thickness of 15 μm, manufactured by Unitika Ltd., referred to as "ON") that had been used in Examples, etc. of the present invention was indicated.

In Comparative Examples 1 and 2, the thickness of the gas barrier layer was changed from that of Reference Examples 1 and 2. In the compositions of Reference Examples 1 and 2, when the thickness of the gas barrier layer was reduced, although the tensile strength and elongation, and the Young's modulus were close to those of the base film, the gas barrier properties decreased remarkably. Further, when the compound (A) was not used, the appearance of the pouch decreased upon retorting under severe conditions. These results demonstrated that the compound (A) had a good effect on the hot-water resistance and gas barrier properties.

Comparative Example 1

A mixed solution (U41) was obtained in the same manner as in Reference Example 1 except that the solid content concentration was adjusted to 5 wt %. First, a mixed solution (T41) that had been prepared with the same composition and in the same manner as in the mixed solution (T39) of Reference Example 1 was diluted with 542 parts by weight of distilled water and 293 parts by weight of methanol, and thereafter 308 parts by weight of the aqueous solution of the partially neutralized product of PAA (concentration: 13 wt %) was rapidly added thereto under stirring. Thus, the mixed solution (U41) with a solid content concentration of 5 wt % was obtained.

Using the mixed solution (U41), coating, heat treatment, ionization and drying were carried out in the same manner as in Example 1. Thus, a layered product (A41) was obtained. Subsequently, lamination was carried out in the same manner as in Example 1. Thus, a laminate (41) was obtained. The layered product and the laminate were evaluated in the same manner as in Example 1.

Comparative Example 2

In Comparative Example 2, a mixed solution (U42) that had been obtained with the same composition and in the same manner as in the mixed solution (U41) of Comparative Example 1 was used. Coating, heat treatment, ionization and drying were carried out in the same manner as in Example 34. Thus, a layered product (B42) was obtained.

Subsequently, lamination was carried out in the same manner as in Example 34. Thus, a laminate (42) was obtained. The layered product and the laminate were evaluated in the same manner as in Example 1.

In Comparative Example 3 and Comparative Example 4, only the compound (A) was used as the compound (L). These results demonstrated that, in either the case of using Al or Ti as the metal atom of the compound (A), the gas barrier properties decreased and the hot-water resistance was also poor. That is, it was demonstrated that the use of the compound (A) and the compound (B) at a specific ratio as the compound (L) allowed excellent gas barrier properties and hot-water resistance to be exhibited. Further, when only the compound (A) was used as the compound (L), the appearance of the pouch decreased upon retorting under severe conditions.

Comparative Example 3

An aqueous solution of the partially neutralized product of PAA and an AIP aqueous solution were prepared in the same manner as in Example 1. Then, a mixed solution (U43) was prepared without the addition of TMOS and GPTMOS so that the weight ratio of [the inorganic component derived from AIP]/[the partially neutralized product of PAA] was 1.0/99.0. Specifically, 100 parts by weight of the aqueous solution of the partially neutralized product of PAA (concentration: 5 wt %) was rapidly added to 2.1 parts by weight of the 9.88 wt % AIP aqueous solution (S43), so that the mixed solution (U43) was obtained.

Using the mixed solution (U43), coating, heat treatment, ionization and drying were carried out in the same manner as in Example 1. Thus, a layered product (A43) was obtained. Subsequently, lamination was carried out in the same manner as in Example 1. Thus, a laminate (43) was obtained. The layered product and the laminate were evaluated in the same manner as in Example 7.

Comparative Example 4

An aqueous solution of the partially neutralized product of PAA was prepared in the same manner as in Example 1. A mixed solution (U44) was prepared so that the weight ratio of [the inorganic component derived from titanium lactate]/[the partially neutralized product of PAA] was 0.9/99.1. Specifically, 1.6 parts by weight of an isopropyl alcohol solution of titanium lactate (concentration: 10 wt %) was added to 100 parts by weight of the aqueous solution of the partially neutralized product of PAA (concentration: 5 wt %), so that the mixed solution (U44) was obtained.

Using the mixed solution (U44), coating, heat treatment, ionization and drying were carried out in the same manner as in Example 1. Thus, a layered product (A44) was obtained. Subsequently, lamination was carried out in the same manner as in Example 1. Thus, a laminate (44) was obtained. The layered product and the laminate were evaluated in the same manner as in Example 7.

As shown in Comparative Example 6, when the ratio of [the number of moles of $M^1$ atom derived from the compound (A)]/[the number of moles of Si atom derived from the compound (B)] is less than the range of 0.1/99.9 to 30/70, the hot-water resistance decreased. On the other hand, when the above-mentioned ratio exceeded the above-mentioned range, the gas barrier properties decreased, as shown in Comparative Example 5. These results demonstrated that the ratio of [the number of moles of $M^1$ atom derived from the compound (A)]/[the number of moles of Si atom derived from the compound (B)] in the above-mentioned range allowed excellent hot-water resistance and gas barrier properties to be achieved.

Comparative Example 5

A mixed solution (U45) was prepared at the same starting material ratio as in Example 3 except that the molar ratio of Al/Si was 40.4/59.6 and the weight ratio of [the inorganic component derived from TMOS and AIP]/[the partially neutralized product of PAA] was adjusted to 40.3/59.7. Specifically, first, 50 parts by weight of TMOS was dissolved in 50 parts by weight of methanol, and 461 parts by weight of the 9.88 wt % AIP aqueous solution (S45) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T45) was obtained. Subsequently, the mixed solution (T45) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Thus, the mixed solution (U45) with a solid content concentration of 5 wt % was obtained.

Using the mixed solution (U45), coating, heat treatment, ionization and drying were carried out in the same manner as in Example 1. Thus, a layered product (A45) was obtained. Subsequently, lamination was carried out in the same manner as in Example 1. Thus, a laminate (45) was obtained. The layered product and the laminate were evaluated in the same manner as in Example 1.

Comparative Example 6

A mixed solution (U46) was prepared at the same starting material ratio as in Example 3 except that the molar ratio of Al/Si was adjusted to 0.06/99.94, and the weight ratio of [the inorganic component derived from TMOS and AIP]/[the partially neutralized product of PAA] was adjusted to 70.0/30.0. Specifically, first, 50 parts by weight of TMOS was dissolved in 50 parts by weight of methanol, and 0.4 part by weight of the 9.88 wt % AIP aqueous solution (S46) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 5 hours. Thus, a mixed solution (T46) was obtained. Subsequently, the mixed solution (T46) was diluted with 243 parts by weight of distilled water and 144 parts by weight of methanol, and thereafter 65 parts by weight of the aqueous solution of the partially neutralized product of PAA (concentration: 13 wt %) was rapidly added thereto under stirring. Thus, the mixed solution (U46) with a solid content concentration of 5 wt % was obtained.

Using the mixed solution (U46), coating, heat treatment, ionization and drying were carried out in the same manner as in Example 1. Thus, a layered product (A46) was obtained. Subsequently, lamination was carried out in the same manner as in Example 1. Thus, a laminate (46) was obtained. The layered product and the laminate were evaluated in the same manner as in Example 1.

Comparative Example 7

A mixed solution (U47) was prepared at the same starting material ratio as in Comparative Example 6, only varying the reaction time.

Specifically, first, 50 parts by weight of TMOS was dissolved in 50 parts by weight of methanol, and 0.4 part by weight of the 9.88 wt % AIP aqueous solution (S47) was added thereto. Subsequently, 3.3 parts by weight of distilled water and 8.2 parts by weight of 0.1 N hydrochloric acid were added thereto so that the ratio of water with respect to TMOS should be 1.95 molar equivalent, and the resultant solution was subjected to hydrolysis and condensation reactions at 10° C. for 1 hour. Thus, a mixed solution (T47) was obtained. Subsequently, the mixed solution (T47) was diluted with 243 parts by weight of distilled water and 144 parts by weight of methanol, and thereafter 65 parts by weight of the aqueous solution of the partially neutralized product of PAA (concentration: 13 wt %) was rapidly added thereto under stirring. Thus, the mixed solution (U47) with a solid content concentration of 5 wt % was obtained.

Using the mixed solution (U47), coating, heat treatment, ionization and drying were carried out in the same manner as in Example 1. Thus, a layered product (A47) was obtained. Subsequently, lamination was carried out in the same manner as in Example 1. Thus, a laminate (47) was obtained. The layered product and the laminate were evaluated in the same manner as in Example 1.

As obvious from Comparative Example 8, in the case where the functional group (carboxyl group) of the polymer (X) was not neutralized with a metal ion having a valence of at least two, the layered product failed to show good hot-water resistance and gas barrier properties. That is, it was demonstrated that good hot-water resistance and gas barrier properties were exhibited due to the above-mentioned neutralization.

Comparative Example 8

In Comparative Example 8, a mixed solution (U48) that had been obtained with the same composition and in the same manner as in the mixed solution (U21) of Example 21 was used.

Coating and heat treatment were carried out in the same manner as in Example 1. Thus, a layered product (A48) was produced. This layered product (A48) was not subjected to ionization and drying. Subsequently, lamination was carried out in the same manner as in Example 1. Thus, a laminate (48) was obtained. The layered product and the laminate were evaluated in the same manner as in Example 1.

Table 1 shows the production conditions of the layered products of Examples, Reference Examples and Comparative Examples.

TABLE 1

| | Base | Coated surface | Thickness of coating layer (*1) | Inorganic component/ Organic component (*2) [weight ratio] | Metal atom of compound (A) | Compound expressed by Formula (II)/Compound expressed by Formula (III) [molar ratio] (*3) |
|---|---|---|---|---|---|---|
| Ex. 1 | PET | Both sides | 0.4 μm | 40.2/59.8 | Al | — |
| Ex. 2 | PET | Both sides | 0.4 μm | 25.5/74.5 | Al | — |
| Ex. 3 | PET | Both sides | 0.4 μm | 40.2/59.8 | Al | — |
| Ex. 4 | PET | Both sides | 0.4 μm | 40.4/59.6 | Ti | — |

TABLE 1-continued

| | | | | | | |
|---|---|---|---|---|---|---|
| Ex. 5 | PET | Both sides | 0.4 μm | 40.6/59.4 | Zr | — |
| Ex. 6 | PET | Both sides | 0.4 μm | 30.2/69.8 | Al | — |
| Ex. 7 | PET | Both sides | 0.4 μm | 30.4/69.6 | Al | — |
| Ex. 8 | PET | Both sides | 0.4 μm | 30.5/69.5 | Al | — |
| Ex. 9 | PET | Both sides | 0.4 μm | 25.5/74.5 | Al | — |
| Ex. 10 | PET | Both sides | 0.4 μm | 80.0/20.0 | Al | — |
| Ex. 11 | PET | Both sides | 0.4 μm | 36.9/63.1 | Al | — |
| Ex. 12 | PET | Both sides | 0.4 μm | 70.0/30.0 | Al | — |
| Ex. 13 | PET | Both sides | 0.4 μm | 20.0/80.0 | Al | — |
| Ex. 14 | PET | Both sides | 0.4 μm | 80.0/20.0 | Al | — |
| Ex. 15 | PET | Both sides | 0.4 μm | 70.0/30.0 | Al | — |
| Ex. 16 | PET | Both sides | 0.4 μm | 10.2/89.8 | Al | — |
| Ex. 17 | PET | Both sides | 0.4 μm | 90.2/9.8 | Al | — |
| Ex. 18 | PET | Both sides | 0.4 μm | 30.5/69.5 | Al | 99.5/0.5 |
| Ex. 19 | PET | Both sides | 0.4 μm | 30.5/69.5 | Al | 80.0/20.0 |
| Ex. 20 | PET | Both sides | 0.4 μm | 31.5/68.5 | Al | 89.9/10.1 |
| Ex. 21 | PET | Both sides | 0.4 μm | 30.5/69.5 | Al | 98.0/2.0 |
| Ex. 22 | PET | Both sides | 0.4 μm | 30.5/69.5 | Al | 99.9/0.1 |
| Ex. 23 | PET | Both sides | 0.4 μm | 30.5/69.5 | Al | 70.0/30.0 |
| Ex. 24 | PET | Both sides | 0.4 μm | 30.5/69.5 | Al | 98.0/2.0 |
| Ex. 25 | PET | Both sides | 0.4 μm | 30.5/69.5 | Al | 98.0/2.0 |
| Ex. 26 | PET | Both sides | 0.4 μm | 30.5/69.5 | Al | 98.0/2.0 |
| Ex. 27 | PET | Both sides | 0.4 μm | 30.5/69.5 | Al | 98.0/2.0 |
| Ex. 28 | PET | Both sides | 0.4 μm | 30.5/69.5 | Al | 98.0/2.0 |
| Ex. 29 (*5) | PET | Both sides | 0.4 μm | 30.4/69.6 | Al | — |
| Ex. 30 (*6) | PET | Both sides | 0.4 μm | 30.4/69.6 | Al | — |
| Ex. 31 | PET | Both sides | 0.4 μm | 30.5/69.5 | Al | 98.0/2.0 |
| Ex. 32 | PET | Both sides | 0.4 μm | 30.5/69.5 | Al | 98.0/2.0 |
| Ex. 33 | PET | One side | 0.4 μm | 30.5/69.5 | Al | 98.0/2.0 |
| Ex. 34 | ON | Both sides | 0.4 μm | 30.5/69.5 | Al | — |
| Ex. 35 | ON | Both sides | 0.4 μm | 30.5/69.5 | Al | 98.0/2.0 |
| Ex. 36 | ON | Both sides | 0.4 μm | 30.5/69.5 | Al | — |
| Ex. 37 | ON | Both sides | 0.4 μm | 30.5/69.5 | Al | 98.0/2.0 |
| Ex. 38 | ON | One side | 0.4 μm | 30.5/69.5 | Al | 98.0/2.0 |
| R. Ex. 1 | PET | Both sides | 1.0 μm | 31.5/68.5 | — | 89.9/10.1 |
| R. Ex. 2 | ON | Both sides | 1.0 μm | 31.5/68.5 | — | 89.9/10.1 |
| R. Ex. 3 | PET | — | — | — | — | — |
| R. Ex. 4 | ON | — | — | — | — | — |
| C. Ex. 1 | PET | Both sides | 0.4 μm | 31.5/68.5 | — | 89.9/10.1 |
| C. Ex. 2 | ON | Both sides | 0.4 μm | 31.5/68.5 | — | 89.9/10.1 |
| C. Ex. 3 | PET | Both sides | 0.4 μm | 1.0/99.0 | Al | — |
| C. Ex. 4 | PET | Both sides | 0.4 μm | 0.9/99.1 | Ti | — |
| C. Ex. 5 | PET | Both sides | 0.4 μm | 40.3/59.7 | Al | — |
| C. Ex. 6 | PET | Both sides | 0.4 μm | 70.0/30.0 | Al | — |
| C. Ex. 7 | PET | Both sides | 0.4 μm | 70.0/30.0 | Al | — |
| C. Ex. 8 | PET | Both sides | 0.4 μm | 30.5/69.5 | Al | 98.0/2.0 |

| | Compound (A)/Compound (B) [molar ratio] (*4) | Compound (D) | Polyvalent metal ion | |
|---|---|---|---|---|
| | | | Ion type | Neutralization degree [%] |
| Ex. 1 | 1.2/98.8 | Acetic acid | Ca | 91 |
| Ex. 2 | 30.1/69.9 | Acetic acid | Ca | 90 |
| Ex. 3 | 1.2/98.8 | Acetic acid | Ca | 91 |
| Ex. 4 | 1.2/98.8 | Acetic acid | Ca | 90 |
| Ex. 5 | 1.2/98.8 | Acetic acid | Ca | 92 |
| Ex. 6 | 1.2/98.8 | Acetic acid | Ca | 91 |
| Ex. 7 | 1.9/98.1 | Acetic acid | Ca | 90 |
| Ex. 8 | 2.8/97.2 | Acetic acid | Ca | 91 |
| Ex. 9 | 30.1/69.9 | Acetic acid | Ca | 92 |
| Ex. 10 | 0.1/99.9 | Acetic acid | Ca | 90 |
| Ex. 11 | 29.9/70.1 | Acetic acid | Ca | 91 |
| Ex. 12 | 0.1/99.9 | Acetic acid | Ca | 91 |
| Ex. 13 | 3.0/97.0 | Acetic acid | Ca | 92 |
| Ex. 14 | 3.0/97.0 | Acetic acid | Ca | 92 |
| Ex. 15 | 3.0/97.0 | Acetic acid | Ca | 91 |
| Ex. 16 | 2.9/97.1 | Acetic acid | Ca | 90 |
| Ex. 17 | 3.0/97.0 | Acetic acid | Ca | 91 |
| Ex. 18 | 2.8/97.2 | Acetic acid | Ca | 90 |
| Ex. 19 | 3.1/96.9 | Acetic acid | Ca | 92 |
| Ex. 20 | 3.1/96.9 | Acetic acid | Ca | 92 |
| Ex. 21 | 2.8/97.2 | Acetic acid | Ca | 91 |
| Ex. 22 | 3.0/97.0 | Acetic acid | Ca | 90 |
| Ex. 23 | 3.0/97.0 | Acetic acid | Ca | 91 |
| Ex. 24 | 2.8/97.2 | Acetic acid | Ca | 51 |
| Ex. 25 | 2.8/97.2 | Acetic acid | Ca | 60 |
| Ex. 26 | 2.8/97.2 | Acetic acid | Ca | 82 |
| Ex. 27 | 2.8/97.2 | Acetic acid | Mg | 90 |

TABLE 1-continued

| | | | | |
|---|---|---|---|---|
| Ex. 28 | 2.8/97.2 | Acetic acid | Zn | 90 |
| Ex. 29 (*5) | 1.9/98.1 | Acetic acid | Ca | 91 |
| Ex. 30 (*6) | 1.9/98.1 | Acetic acid | Ca | 90 |
| Ex. 31 | 2.8/97.2 | Propionic acid | Ca | 92 |
| Ex. 32 | 2.8/97.2 | Hexanoic acid | Ca | 90 |
| Ex. 33 | 2.8/97.2 | Acetic acid | Ca | 92 |
| Ex. 34 | 2.8/97.2 | Acetic acid | Ca | 91 |
| Ex. 35 | 2.8/97.2 | Acetic acid | Ca | 92 |
| Ex. 36 | 2.8/97.2 | Acetic acid | Ca | 91 |
| Ex. 37 | 2.8/97.2 | Acetic acid | Ca | 90 |
| Ex. 38 | 2.8/97.2 | Acetic acid | Ca | 91 |
| R. Ex. 1 | 0/100 | — | Ca | 60 |
| R. Ex. 2 | 0/100 | — | Ca | 60 |
| R. Ex. 3 | — | — | — | — |
| R. Ex. 4 | — | — | — | — |
| C. Ex. 1 | 0/100 | — | Ca | 60 |
| C. Ex. 2 | 0/100 | — | Ca | 60 |
| C. Ex. 3 | 100/0 | Acetic acid | Ca | 90 |
| C. Ex. 4 | 100/0 | — | Ca | 90 |
| C. Ex. 5 | 40.4/59.6 | Acetic acid | Ca | 92 |
| C. Ex. 6 | 0.06/99.94 | Acetic acid | Ca | 90 |
| C. Ex. 7 | 0.06/99.94 | Acetic acid | Ca | 90 |
| C. Ex. 8 | 2.8/97.2 | Acetic acid | — | 0 |

(*1) The thickness of a gas barrier layer on one side
(*2) The inorganic component is the inorganic component derived from the Compound (L). The organic component is the total of the organic component derived from the Compound (L) and the organic component derived from the polymer (X) and includes the organic component of GPTMOS.
(*3) Compound expressed by Formula (II): TMOS; Compound expressed by Formula (III): GPTMOS
(*4) The molar ratio of [the metal atom derived from the Compound (A)]/[the Si atom derived from the Compound (B)]
(*5) The ratio of the equivalent amount of the amino groups in ethylenediamine with respect to 100 equivalents of the carboxyl group contained in the polymer (X) is 1.9.
(*6) The ratio of the equivalent amount of the hydroxyl groups in polyvinyl alcohol with respect to 100 equivalents of the carboxyl group contained in the polymer (X) is 18.2.

Table 2 shows the evaluation results of the layered products.

TABLE 2

| | Oxygen permeability [cc/m²/day/atm] | | Contact angle [degree] | Tensile strength [MPa] | | Tensile elongation [%] | | Young's modulus [MPa] | | Dry heat shrinkage ratio [%] | |
|---|---|---|---|---|---|---|---|---|---|---|---|
| | Before retorting | After 10% elongation | | MD | TD | MD | TD | MD | TD | MD | TD |
| Ex. 1 | 0.22 | — | 17 | 210 | 170 | 120 | 180 | 5500 | 5200 | 0.3 | 0.4 |
| Ex. 2 | 0.63 | — | 18 | 210 | 160 | 110 | 170 | 5600 | 5100 | 0.4 | 0.3 |
| Ex. 3 | 0.21 | — | 22 | 210 | 170 | 120 | 180 | 5500 | 5200 | 0.3 | 0.4 |
| Ex. 4 | 0.33 | — | 21 | 210 | 180 | 130 | 180 | 5600 | 5300 | 0.3 | 0.4 |
| Ex. 5 | 0.29 | — | 22 | 220 | 170 | 120 | 180 | 5600 | 5200 | 0.4 | 0.4 |
| Ex. 6 | 0.24 | — | 21 | 210 | 170 | 120 | 180 | 5400 | 5200 | 0.4 | 0.4 |
| Ex. 7 | 0.12 | 0.28 | 21 | 210 | 180 | 120 | 190 | 5500 | 5300 | 0.3 | 0.3 |
| Ex. 8 | 0.05 | — | 22 | 220 | 170 | 130 | 180 | 5500 | 5300 | 0.4 | 0.4 |
| Ex. 9 | 0.63 | — | 21 | 210 | 160 | 110 | 170 | 5600 | 5100 | 0.4 | 0.3 |
| Ex. 10 | 0.58 | — | 22 | 200 | 170 | 120 | 180 | 5500 | 5200 | 0.3 | 0.4 |
| Ex. 11 | 0.42 | — | 22 | 210 | 170 | 120 | 180 | 5500 | 5300 | 0.4 | 0.4 |
| Ex. 12 | 0.43 | — | 21 | 210 | 160 | 120 | 180 | 5400 | 5300 | 0.3 | 0.4 |
| Ex. 13 | 0.64 | — | 22 | 210 | 170 | 110 | 190 | 5500 | 5200 | 0.3 | 0.4 |
| Ex. 14 | 0.59 | — | 22 | 210 | 170 | 110 | 180 | 5500 | 5300 | 0.4 | 0.4 |
| Ex. 15 | 0.32 | — | 21 | 210 | 160 | 120 | 180 | 5400 | 5300 | 0.3 | 0.4 |
| Ex. 16 | 0.78 | — | 21 | 220 | 170 | 120 | 190 | 5500 | 5200 | 0.4 | 0.4 |
| Ex. 17 | 0.82 | — | 22 | 210 | 170 | 130 | 190 | 5400 | 5100 | 0.4 | 0.4 |
| Ex. 18 | 0.05 | — | 23 | 210 | 180 | 120 | 180 | 5600 | 5200 | 0.4 | 0.4 |
| Ex. 19 | 0.05 | 0.11 | 51 | 220 | 170 | 110 | 190 | 5500 | 5300 | 0.3 | 0.4 |
| Ex. 20 | 0.05 | 0.20 | 46 | 210 | 160 | 120 | 180 | 5500 | 5100 | 0.4 | 0.4 |
| Ex. 21 | 0.05 | 0.28 | 26 | 210 | 170 | 120 | 170 | 5600 | 5200 | 0.3 | 0.4 |
| Ex. 22 | 0.05 | — | 21 | 220 | 170 | 130 | 190 | 5500 | 5200 | 0.4 | 0.3 |
| Ex. 23 | 0.83 | 0.84 | 55 | 210 | 170 | 120 | 180 | 5400 | 5300 | 0.4 | 0.4 |
| Ex. 24 | 0.62 | — | 24 | 200 | 170 | 120 | 170 | 5500 | 5100 | 0.3 | 0.4 |
| Ex. 25 | 0.42 | — | 25 | 220 | 170 | 130 | 190 | 5400 | 5200 | 0.4 | 0.4 |
| Ex. 26 | 0.05 | — | 26 | 210 | 170 | 120 | 170 | 5500 | 5200 | 0.3 | 0.4 |
| Ex. 27 | 0.05 | — | 25 | 200 | 170 | 110 | 180 | 5600 | 5300 | 0.3 | 0.4 |
| Ex. 28 | 0.05 | — | 25 | 210 | 170 | 120 | 190 | 5400 | 5100 | 0.4 | 0.3 |
| Ex. 29 | 0.05 | — | 21 | 220 | 170 | 120 | 180 | 5500 | 5200 | 0.4 | 0.4 |
| Ex. 30 | 0.05 | 0.05 | 22 | 200 | 170 | 130 | 190 | 5600 | 5300 | 0.4 | 0.4 |
| Ex. 31 | 0.11 | — | 26 | 210 | 170 | 110 | 180 | 5500 | 5300 | 0.4 | 0.3 |
| Ex. 32 | 0.62 | — | 25 | 200 | 170 | 120 | 180 | 5500 | 5200 | 0.4 | 0.4 |
| Ex. 33 | 0.13 | 0.45 | 25 | 230 | 190 | 140 | 200 | 5200 | 5000 | 0.2 | 0.2 |

TABLE 2-continued

| | Oxygen permeability [cc/m²/day/atm] | | Contact angle [degree] | Tensile strength [MPa] | | Tensile elongation [%] | | Young's modulus [MPa] | | Dry heat shrinkage ratio [%] | |
|---|---|---|---|---|---|---|---|---|---|---|---|
| | Before retorting | After 10% elongation | | MD | TD | MD | TD | MD | TD | MD | TD |
| Ex. 34 | 0.09 | 0.47 | 21 | 230 | 220 | 120 | 130 | 2800 | 2400 | 0.4 | 0.6 |
| Ex. 35 | 0.11 | 0.44 | 25 | 230 | 220 | 110 | 120 | 2900 | 2500 | 0.4 | 0.6 |
| Ex. 36 | 0.14 | — | 22 | 240 | 230 | 120 | 130 | 2800 | 2600 | 0.5 | 0.6 |
| Ex. 37 | 0.14 | — | 25 | 230 | 210 | 120 | 120 | 2800 | 2500 | 0.4 | 0.6 |
| Ex. 38 | 0.23 | — | 25 | 260 | 240 | 140 | 150 | 2600 | 2300 | 0.3 | 0.3 |
| R. Ex. 1 | 0.41 | 0.85 | 45 | 180 | 150 | 100 | 170 | 6200 | 5600 | 1.0 | 1.5 |
| R. Ex. 2 | 0.62 | 1.03 | 45 | 200 | 210 | 100 | 80 | 3300 | 3000 | 1.5 | 2.1 |
| R. Ex. 3 | — | — | — | 250 | 230 | 110 | 130 | 4800 | 4700 | 0.2 | 0.2 |
| R. Ex. 4 | — | — | — | 220 | 260 | 90 | 100 | 2400 | 2200 | 0.3 | 0.3 |
| C. Ex. 1 | 5.03 | — | 45 | 210 | 170 | 120 | 180 | 5500 | 5200 | 0.4 | 0.4 |
| C. Ex. 2 | 6.14 | — | 45 | 260 | 240 | 140 | 150 | 2600 | 2300 | 0.5 | 0.6 |
| C. Ex. 3 | 1.84 | 4.72 | 15 | 210 | 160 | 110 | 170 | 5600 | 5100 | 0.4 | 0.3 |
| C. Ex. 4 | 2.02 | 5.04 | 14 | 210 | 160 | 110 | 170 | 5600 | 5100 | 0.4 | 0.4 |
| C. Ex. 5 | 1.57 | — | 22 | 210 | 160 | 110 | 170 | 5600 | 5100 | 0.4 | 0.3 |
| C. Ex. 6 | 0.58 | — | 21 | 200 | 170 | 120 | 180 | 5500 | 5200 | 0.3 | 0.4 |
| C. Ex. 7 | 0.58 | — | 16 | 200 | 170 | 120 | 180 | 5500 | 5200 | 0.3 | 0.4 |
| C. Ex. 8 | 40< | — | 45 | 210 | 170 | 130 | 180 | 5400 | 5100 | 0.4 | 0.4 |

Table 3 shows the evaluation results of the laminates.

TABLE 3

| | Lamination structure (*1) | Oxygen permeability after retorting (*2) [cc/m²/day/atm] | Appearance after retorting at 135° C. for 60 minutes |
|---|---|---|---|
| Ex. 1 | Layered product (A1)//ON//CPP | 0.62 | S |
| Ex. 2 | Layered product (A2)//ON//CPP | 0.82 | S |
| Ex. 3 | Layered product (A3)//ON//CPP | 0.62 | S |
| Ex. 4 | Layered product (A4)//ON//CPP | 0.79 | S |
| Ex. 5 | Layered product (A5)//ON//CPP | 0.82 | S |
| Ex. 6 | Layered product (A6)//ON//CPP | 0.63 | S |
| Ex. 7 | Layered product (A7)//ON//CPP | 0.49 | S |
| Ex. 8 | Layered product (A8)//ON//CPP | 0.31 | S |
| Ex. 9 | Layered product (A9)//ON//CPP | 0.82 | S |
| Ex. 10 | Layered product (A10)//ON//CPP | 0.84 | S |
| Ex. 11 | Layered product (A11)//ON//CPP | 0.61 | S |
| Ex. 12 | Layered product (A12)//ON//CPP | 0.58 | S |
| Ex. 13 | Layered product (A13)//ON//CPP | 0.81 | S |
| Ex. 14 | Layered product (A14)//ON//CPP | 0.83 | S |
| Ex. 15 | Layered product (A15)//ON//CPP | 0.45 | S |
| Ex. 16 | Layered product (A16)//ON//CPP | 0.99 | S |
| Ex. 17 | Layered product (A17)//ON//CPP | 0.97 | S |
| Ex. 18 | Layered product (A18)//ON//CPP | 0.21 | S |
| Ex. 19 | Layered product (A19)//ON//CPP | 0.23 | S |
| Ex. 20 | Layered product (A20)//ON//CPP | 0.13 | S |
| Ex. 21 | Layered product (A21)//ON//CPP | 0.09 | S |
| Ex. 22 | Layered product (A22)//ON//CPP | 0.29 | S |
| Ex. 23 | Layered product (A23)//ON//CPP | 0.98 | S |
| Ex. 24 | Layered product (A24)//ON//CPP | 0.42 | S |
| Ex. 25 | Layered product (A25)//ON//CPP | 0.31 | S |
| Ex. 26 | Layered product (A26)//ON//CPP | 0.12 | S |
| Ex. 27 | Layered product (A27)//ON//CPP | 0.13 | S |
| Ex. 28 | Layered product (A28)//ON//CPP | 0.11 | S |
| Ex. 29 | Layered product (A29)//ON//CPP | 0.13 | S |
| Ex. 30 | Layered product (A30)//ON//CPP | 0.12 | S |
| Ex. 31 | Layered product (A31)//ON//CPP | 0.19 | S |
| Ex. 32 | Layered product (A32)//ON//CPP | 0.88 | S |
| Ex. 33 | Layered product (A33)//ON//CPP | 0.45 | S |
| Ex. 34 | Layered product (B34)//CPP | 0.42 | S |
| Ex. 35 | Layered product (B35)//CPP | 0.23 | S |
| Ex. 36 | PET//Layered product (B36)//CPP | 0.39 | S |
| Ex. 37 | PET//Layered product (B37)//CPP | 0.22 | S |
| Ex. 38 | Layered product (B38)//CPP | 0.63 | S |
| R. Ex. 1 | Layered product (A39)//ON//CPP | 0.18 | A |
| R. Ex. 2 | Layered product (B40)//CPP | 0.38 | A |
| R. Ex. 3 | — | — | — |
| R. Ex. 4 | — | — | — |
| C. Ex. 1 | Layered product (A41)//ON//CPP | 3.07 | A |
| C. Ex. 2 | Layered product (B42)//CPP | 4.13 | A |
| C. Ex. 3 | Layered product (A43)//ON//CPP | 3.56 | B |
| C. Ex. 4 | Layered product (A44)//ON//CPP | 5.13 | B |
| C. Ex. 5 | Layered product (A45)//ON//CPP | 2.05 | A |
| C. Ex. 6 | Layered product (A46)//ON//CPP | 2.15 | A |
| C. Ex. 7 | Layered product (A47)//ON//CPP | 2.09 | A |
| C. Ex. 8 | Layered product (A48)//ON//CPP | 40< | B |

(*1) "/" denotes an adhesive layer.
(*2) Retorting at 120° C. for 30 minutes

As shown in Table 2 and Table 3, Examples in which the ratio of [the number of moles of $M^1$ derived from the compound (A)]/[the number of moles of Si atom derived from the compound (B)] is in the range of 0.1/99.9 to 30.1/69.9 (for example, 29.9/70.1 or 30.0/70.0) showed high oxygen barrier properties before and after retorting. Meanwhile, Comparative Examples in which the above-mentioned ratio was out of the above-mentioned range showed low oxygen barrier properties after retorting. Further, as shown in Reference Example 1, an increase in the thickness of the gas barrier layer(s) enhanced the oxygen barrier properties even when the compound (A) was not added. However, the appearance after retorting decreased in this case.

INDUSTRIAL APPLICABILITY

The gas barrier layered product of the present invention can be used effectively as packaging materials for foods, medicine, medical equipment, machine parts, and garments, for example. Above all, it is used particularly effectively for food packaging for which gas barrier properties under high humidity are required. Preferred examples of the use of the gas barrier layered product of the present invention include retort pouch.

The invention claimed is:

1. A gas barrier layered product comprising:
a base; and
at least one layer with gas barrier properties, the layer being stacked on the base, wherein
the layer with gas barrier properties is formed of a composition that includes a hydrolyzed condensate of at least one type of compound (L) containing a hydrolyzable characteristic group, and a neutralized product of a polymer (X) containing at least one functional group selected from a carboxyl group and a carboxylic acid anhydride group,
the compound (L) includes a compound (A) and a compound (B) that contains Si to which the hydrolyzable characteristic group is bonded,
the compound (A) is at least one type of compound expressed by the following Formula (I):

$$M^1 X^1_m Y^1_{n-m} \qquad (I),$$

where: $M^1$ denotes any one selected from Al, Ti, and Zr;
$X^1$ denotes any one selected from F, Cl, Br, I, $OR^1$, $R^2COO$, $R^3COCH_2COR^4$, and $NO_3$;
$Y^1$ denotes any one selected from F, Cl, Br, I, $OR^5$, $R^6COO$, $R^7COCH_2COR^8$, $NO_3$ and $R^9$;
$R^1$, $R^2$, $R^5$ and $R^6$ each denote a hydrogen atom or an alkyl group, independently;
$R^3$, $R^4$, $R^7$, $R^8$ and $R^9$ each denote an alkyl group, independently;
n is equal to the valence of $M^1$; and
m denotes an integer of 1 to n,
the compound (B) includes at least one type of compound expressed by the following Formula (II):

$$Si(OR^{10})_p R^{11}_{4-p-q} X^2_q \qquad (II),$$

where: $R^{10}$ denotes an alkyl group;
$R^{11}$ denotes an alkyl group, an aralkyl group, an aryl group or an alkenyl group;
$X^2$ denotes a halogen atom;
p and q each denote an integer of 0 to 4, independently; and
$1 \leq p+q \leq 4$,
at least part of —COO— group contained in the functional group of the polymer (X) is neutralized with a metal ion having a valence of at least two, the percentage of the compound expressed by Formula (II) in the compound (B) is at least 80 mol %, and
the composition has a ratio of [the number of moles of $M^1$ atom derived from the compound (A)]/[the number of moles of Si atom derived from the compound (B)] in the range of 0.1/99.9 to 30.0/70.0.

2. The gas barrier layered product according to claim 1, wherein
the compound (B) further includes at least one type of compound expressed by the following Formula (III):

$$Si(OR^{12})_r X^3_s Z^3_{4-r-s} \qquad (III),$$

where: $R^{12}$ denotes an alkyl group;
$X^3$ denotes a halogen atom;
$Z^3$ denotes an alkyl group substituted by a functional group having reactivity with a carboxyl group;
r and s each denote an integer of 0 to 3, independently; and
$1 \leq r+s \leq 3$, and
a ratio of [the number of moles of Si atom derived from the compound expressed by Formula (II)]/[the number of moles of Si atom derived from the compound expressed by Formula (III)] is in the range of 99.5/0.5 to 80.0/20.0.

3. The gas barrier layered product according to claim 1, wherein
the at least one layer with gas barrier properties has a total thickness of is 1 μm or less, and
the gas barrier layered product has an oxygen permeability of 1.1 cm³/(m²·day·atm) or less in an atmosphere of 20° C. and 85% RH.

4. The gas barrier layered product according to claim 1, wherein
$M^1$ is Al.

5. The gas barrier layered product according to claim 1, wherein
a ratio of [a weight of inorganic component derived from the compound (L)]/[a total of a weight of organic component derived from the compound (L) and a weight of organic component derived from the polymer (X)] is in the range of 20.0/80.0 to 80.0/20.0.

6. The gas barrier layered product according to claim 1, wherein
a ratio of [a weight of inorganic component derived from the compound (L)]/[a total of a weight of organic component derived from the compound (L) and a weight of organic component derived from the polymer (X)] is in the range of 30.5/69.5 to 70.0/30.0.

7. The gas barrier layered product according to claim 1, wherein
the polymer (X) is at least one type of polymer selected from polyacrylic acid and polymethacrylic acid.

8. The gas barrier layered product according to claim 1, wherein
at least 60 mol % of the —COO— group contained in the functional group of the polymer (X) is neutralized with the metal ion.

9. The gas barrier layered product according to claim 1, wherein
the metal ion is at least one ion selected from the group consisting of calcium ion, magnesium ion, barium ion, zinc ion, iron ion and aluminum ion.

10. The gas barrier layered product according to claim 1, wherein
the layer with gas barrier properties has a contact angle with water of 20° or more.

11. The gas barrier layered product according to claim 1, wherein
the composition includes a compound (P) different from the compound (L) and the polymer (X), and
the compound (P) contains at least two amino groups.

12. The gas barrier layered product according to claim 1, wherein
the composition includes a compound (Q) different from the compound (L) and the polymer (X), and
the compound (Q) contains at least two hydroxyl groups.

13. A method for producing a gas barrier layered product comprising the steps of:
(i) forming, on a base, a layer formed of a composition including a polymer (X) and a hydrolyzed condensate of a compound (L) that contains a hydrolyzable characteristic group;
(ii) bringing the layer into contact with a solution that contains a metal ion having a valence of at least two, wherein
the compound (L) includes a compound (A) and a compound (B) that contains Si to which the hydrolyzable characteristic group is bonded, the compound (A) is at least one type of compound expressed by the following Formula (I):

$$M^1 X^1_m Y^1_{n-m} \quad (I),$$

where: $M^1$ denotes any one selected from Al, Ti, and Zr;
$X^1$ denotes any one selected from F, Cl, Br, I, $OR^1$, $R^2COO$, $R^3COCH_2COR^4$, and $NO_3$;
$Y^1$ denotes any one selected from F, Cl, Br, I, $OR^5$, $R^6COO$, $R^7COCH_2COR^8$, $NO_3$ and $R^9$;
$R^1$, $R^2$, $R^5$ and $R^6$ each denote a hydrogen atom or an alkyl group, independently;
$R^3$, $R^4$, $R^7$, $R^8$ and $R^9$ each denote an alkyl group, independently;
n is equal to the valence of $M^1$; and
m denotes an integer of 1 to n,
the compound (B) includes at least one type of compound expressed by the following Formula (II):

$$Si(OR^{10})_p R^{11}_{4-p-q} X^2_q \quad (II),$$

where: $R^{10}$ denotes an alkyl group;
$R^{11}$ denotes an alkyl group, an aralkyl group, an aryl group or an alkenyl group;
$X^2$ denotes a halogen atom;
p and q each denote an integer of 0 to 4, independently; and
$1 \leq p+q \leq 4$,
the polymer (X) is a polymer containing at least one functional group selected from a carboxyl group and a carboxylic acid anhydride group,
the percentage of the compound expressed by Formula (II) in the compound (B) is at least 80 mol %, and
the composition has a ratio of [the number of moles of $M^1$ atom derived from the compound (A)]/[the number of moles of Si atom derived from the compound (B)] in the range of 0.1/99.9 to 30.0/70.0.

14. The production method according to claim 13, wherein step (i) comprises the steps of:
(i-a) preparing a solution (S) that includes at least one type of compound selected from the compound (A) and the partially hydrolyzed condensate of the compound (A), and the compound (D) containing a carboxyl group and having a molecular weight of 100 or less;
(i-b) preparing a solution (T) by mixing the solution (S) with at least one type of compound selected from the compound (B) and the partially hydrolyzed condensate of the compound (B);
(i-c) forming, in the solution (T), a hydrolyzed condensate of a plurality of compounds that include the compound (A) and the compound (B);
(i-d) preparing a solution (U) by mixing the polymer (X) with the solution (T) that has been subjected to step (i-c); and
(i-e) forming the layer by coating the base with the solution (U) and drying it.

15. The production method according to claim 13, wherein the compound (B) further includes at least one type of compound expressed by the following Formula (III):

$$Si(OR^{12})_r X^3_s Z^3_{4-r-s} \quad (III),$$

where: $R^{12}$ denotes an alkyl group;
$X^3$ denotes a halogen atom;
$Z^3$ denotes an alkyl group substituted by a functional group having reactivity with a carboxyl group;
r and s each denote an integer of 0 to 3, independently; and
$1 \leq r+s \leq 3$, and
a ratio of [the number of moles of Si atom derived from the compound expressed by Formula (II)]/[the number of moles of Si atom derived from the compound expressed by Formula (III)] is in the range of 99.5/0.5 to 80.0/20.0.

16. The production method according to claim 13, wherein at least 60 mol % of —COO— group contained in the functional group of the polymer (X) is neutralized with the metal ion in step (ii).

17. The production method according to claim 13, further comprising the step of:
heat treating the layer at a temperature of 120° C. to 240° C., after step (i) and before and/or after step (ii).

* * * * *